(12) United States Patent
Denolf et al.

(10) Patent No.: US 11,327,677 B1
(45) Date of Patent: May 10, 2022

(54) DATA MOVER CIRCUITRY FOR N-DIMENSIONAL DATA IN AN INTEGRATED CIRCUIT

(71) Applicant: Xilinx, Inc., San Jose, CA (US)

(72) Inventors: Kristof Denolf, Longmont, CO (US); Jack S. Lo, Santa Clara, CA (US); Kornelis A. Vissers, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/019,454

(22) Filed: Sep. 14, 2020

(51) Int. Cl.
    *G06F 3/06* (2006.01)
(52) U.S. Cl.
    CPC .......... *G06F 3/0647* (2013.01); *G06F 3/0604* (2013.01); *G06F 3/0656* (2013.01); *G06F 3/0659* (2013.01); *G06F 3/0673* (2013.01)
(58) Field of Classification Search
    None
    See application file for complete search history.

(56) References Cited

U.S. PATENT DOCUMENTS

2019/0200029 A1* 6/2019 Bangma ................. H04N 19/40

OTHER PUBLICATIONS

Krste Asanovic, et al., The Landscape of Parallel Computing Research: A View from Berkeley, Electrical Engineering and Computer Sciences University of California at Berkeley, Dec. 18, 2006, pp. 1-56.
Mark W. Powell, et al., A Scalable Image Processing Frame for Gigapixel Mars and Other Celestial Body Images, IEEEAC paper #1533, Version 1, Updated Aug. 5, 2009, pp. 1-2.

* cited by examiner

*Primary Examiner* — Gary W. Cygiel
(74) *Attorney, Agent, or Firm* — Kevin T. Cuenot

(57) ABSTRACT

An integrated circuit (IC) can include a decomposer data mover circuit configured to read sub-arrays from array data stored in a source memory; generate metadata headers for the sub-arrays, wherein each metadata header includes location information indicating location of a corresponding sub-array within the array data; create data tiles, wherein each data tile includes a sub-array and a corresponding metadata header; and output the data tiles to compute circuitry within the IC. The IC can include a composer data mover circuit configured to receive processed versions of the data tiles from the compute circuitry; extract valid data regions from the processed versions of the data tiles; and write the valid data regions to a destination memory based on the location information from the metadata headers of the processed versions of the data tiles.

20 Claims, 10 Drawing Sheets

DATA MOVER CIRCUITRY FOR N-DIMENSIONAL DATA IN AN INTEGRATED CIRCUIT

TECHNICAL FIELD

This disclosure relates to integrated circuits (ICs) and, more particularly, to data mover circuitry for moving N-dimensional data into, and out of, an IC.

BACKGROUND

Modern integrated circuits (ICs) are used to provide computing power in a variety of different applications. In many applications, the data sets being processed are so large that the data sets do not fit within the available on-chip memory of the ICs used to perform the computations. This means that the compute circuitry of the IC is unable to address the entire data set being processed within the IC itself. The compute circuitry within the IC may only operate on a portion of the data set at any given time.

SUMMARY

An integrated circuit (IC) can include a decomposer data mover circuit configured to read a plurality of sub-arrays from array data stored in a source memory; generate a plurality of metadata headers for the plurality of sub-arrays, wherein each metadata header includes location information indicating location of a corresponding sub-array within the array data; create a plurality of data tiles, wherein each data tile includes a sub-array of the plurality of sub-arrays and a corresponding metadata header of the plurality of metadata headers; and output the plurality of data tiles to compute circuitry within the integrated circuit. The IC can include a composer data mover circuit configured to receive processed versions of the plurality of data tiles from the compute circuitry; extract valid data regions from the processed versions of the plurality of data tiles; and write the valid data regions to a destination memory based on the location information from the metadata headers of the processed versions of the plurality of data tiles.

A decomposer data mover circuit disposed in an IC can include a read data engine configured to read a plurality of sub-arrays from array data stored in a source memory and a metadata generator configured to generate a plurality of metadata headers for the plurality of sub-arrays. Each metadata header may include location information indicating location of a corresponding sub-array within the array data. The read data engine may be configured to create a plurality of data tiles, wherein each data tile includes a sub-array of the plurality of sub-arrays and a corresponding metadata header of the plurality of metadata headers. The read data engine further may output the plurality of data tiles to compute circuitry within the IC. The decomposer data mover circuit may also include a controller configured to coordinate operation of the read data engine and the metadata generator.

A composer data mover circuit disposed in an IC can include a write data engine configured to receive a plurality of data tiles from compute circuitry in the IC, wherein each data tile includes a sub-array and a metadata header. The compose data mover circuit may include a metadata parser configured to parse the metadata headers of the plurality of data tiles, wherein each metadata header specifies location information indicating location of the sub-array of the data tile in array data stored in a destination memory and a valid data region of the sub-array. The write data engine is configured to extract the valid data regions from the sub-arrays of the plurality of data tiles based on the metadata headers and write the valid data regions to locations in the array data stored in the destination memory based on the location information of the respective metadata headers. The composer data mover circuit may include a controller configured to coordinate operation of the write data engine and the metadata parser.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
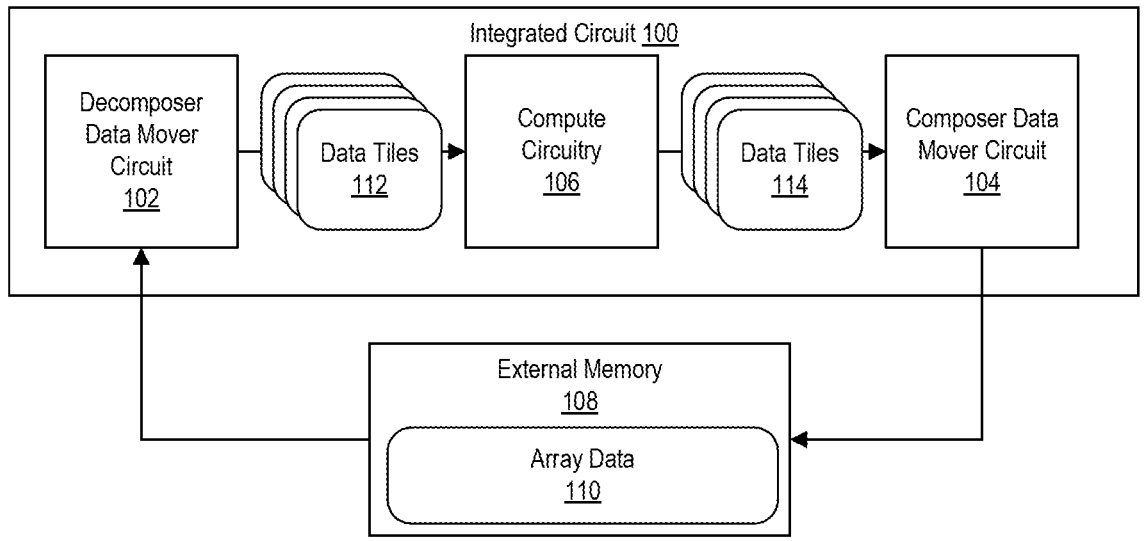
FIG. 1 illustrates an example of an integrated circuit (IC) that includes example data mover circuits.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to data mover circuitry for moving N-dimensional data into and out of an IC. In many cases, the data sets being operated on by an IC are so large that the entirety of the data set cannot be stored within the available on-chip memory of the IC used to operate on the data set. The on-chip memory is not large enough. The inventive arrangements described within this disclosure provide example circuit architectures capable of efficiently moving data into and out of an IC. The example circuit architectures allow compute circuitry implemented within the IC to efficiently operate on portions of the data set referred to as "data tiles." Once generated, the data tiles may be moved efficiently throughout the IC.

In general, the example circuit architectures are capable of partitioning or subdividing N-dimensional data stored in a memory into data tiles that may be efficiently handled within the IC. The memory may be external to the IC or off-chip. The example circuit architectures are capable of reading a portion of the N-dimensional data from the external memory and forming data tiles from the read portions of the N-dimensional data. Each data tile that is generated includes a portion of the N-dimensional data. The data tiles are sized to fit within the available on-chip memory of the IC.

The example circuit architectures described within this disclosure are also capable of generating a metadata header and including such metadata header in each data tile. The metadata header of a data tile includes various attributes describing the portion of N-dimensional data included within the data tile. By including the metadata header in each data tile, compute circuitry is able to more efficiently process the data contained in each data tile. The metadata header, for example, may specify the location from within the N-dimensional array from which the portion of the N-dimensional data contained in the data tile was taken or read. This allows the compute circuitry to be aware of the position of the data being processed as that data originally existed in the N-dimensional array in the external memory. The metadata headers also allow data of processed data tiles to be written back to the correct or appropriate location(s) within the N-dimensional data.

In one or more other example implementations, the data tiles are self-contained. A self-contained data tile is one where the data contained therein includes a region of data that overlaps with, or is common with, a region of data contained in another different data tile. These regions of overlapping or common data are referred to herein as "overlap regions." Such data tiles are said to be "self-contained" in that each of the data tiles includes the data structure(s) necessary for the compute circuitry to implement features of N-dimensional signal processing. These features can include, but are not limited to, neighborhood effects, border handling, and/or multi-rate data processing. The ability to include overlap regions allows such data tiles to be processed locally by the compute circuitry of the IC. The example circuit architectures are also capable of re-assembling the data from processed data tiles using only those portions of data of the data tiles considered to be valid and writing the valid data back to the N-dimensional data stored in the external memory or in another external memory.

In one or more example implementations, the data mover circuits may include one or more input data mover circuits and one or more output data mover circuits. An input data mover circuit is referred to herein as a decomposer data mover circuit or "decomposer circuit." An output data mover circuit is referred to herein as a composer data mover circuit or "composer circuit." The data mover circuits are capable of processing the N-dimensional data, where "N" is an integer having a value of 1 or more.

The decomposer circuit is capable of transferring portions of the N-dimensional data stored in the external memory into the IC in which the decomposer circuit resides. Each data tile generated by the decomposer circuit includes a portion of the N-dimensional data referred to as a sub-array and a metadata header that is generated by the decomposer circuit.

The composer circuit is capable of transferring valid data regions of processed data tiles back to the N-dimensional data stored in the external memory. In one or more example implementations, the composer circuit is capable of combining the valid data regions of processed data tiles back into the N-dimensional array to yield element-wise exact results. The phrase "element-wise exact results" means that when the actual state of the N-dimensional array subsequent to the incremental processing performed by the compute circuitry on a data tile-by-data tile basis is compared with an expected state of the N-dimensional array post processing as if the N-dimensional array had been loaded in the IC in its entirety and processed as a whole (e.g., without using data units or partitioning), the actual state of the N-dimensional array is the same as, e.g., matches, the expected state of the N-dimensional array.

Throughout this disclosure, examples are provided where data is read from an external memory and written back to the external memory. It should be appreciated that the inventive arrangements are not intended to be so limited. For example, data may be read from a source external memory and written to a destination external memory. In some implementations, the source external memory may be the same as the destination external memory. In other implementations, the source external memory may be different from the destination external memory. The inventive arrangements described herein may be used in either scenario.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an IC 100 that includes data mover circuits. In the example of FIG. 1, IC 100 includes a decomposer data mover circuit (decomposer circuit) 102 and a composer data mover circuit (composer circuit) 104. IC 100 further may include compute circuitry 106. IC 100 is coupled to an external memory 108. External memory is located "off-chip" from IC 100. For example, IC 100 and external memory 108 may be disposed on a same circuit board.

In other example implementations, external memory 108 may represent a source external memory and a destination external memory. While the source external memory and the destination external memory may be the same memory, in other cases, the source external memory and the destination external memory may be physically distinct memories located on the same circuit board or located on different circuit boards. In other example implementations, the source external memory and the destination external memory may be the same physical memory but correspond to different logical partitions of the external memory.

IC 100 may be implemented as any of a variety of different ICs. In one aspect, IC 100 is implemented as a programmable IC. An example of a programmable IC is a field programmable gate array (FPGA). A programmable IC includes at least a portion of programmable logic. The programmable IC may be formed entirely of programmable logic or include both programmable logic and one or more portions of hardwired circuitry also referred to as hardwired circuit blocks. In another aspect, IC 100 may include a processor such as a central processing unit or other circuit capable of executing program code. In still another aspect, IC 100 may be an application specific integrated circuit (ASIC). In some cases, an ASIC includes a portion of programmable logic. IC 100 further may be a System-on-Chip (SoC) that includes one or more of the example circuit structures described in any combination.

In one example implementation, decomposer circuit 102 and composer circuit 104 are implemented in programmable logic. In another example implementation, decomposer circuit 102 and composer circuit 104 are implemented as hardwired circuit blocks. In other cases, one or more circuit blocks forming decomposer circuit 102 and/or composer circuit 104 are implemented as hardwired circuit blocks while one or more other ones of the circuit blocks of decomposer circuit 102 and/or composer circuit 104 are implemented using programmable logic. In still other cases, one or more portions of decomposer circuit 102 and/or composer circuit 104 may be implemented using a processor while one or more other portions are implemented using dedicated-hardwired circuit blocks and/or programmable logic.

In one or more example implementations, external memory 108 may be implemented as any of a variety of available random-access memories (RAMs). In the example of FIG. 1, external memory 108 stores array data 110. Array data 110 is an example of N-dimensional data, where "N" is an integer value of 1 or more. Examples of N-dimensional data may include 1-dimensional data, 2-dimensional images, 3-dimensional images, 3-dimensional tensor data, or the like.

Decomposer circuit 102 is capable of reading portions of array data 110 from external memory 108 and generating data tiles 112 from the portions of data read from array data 110. Decomposer circuit 102 is capable of slicing (e.g., decomposing) array data 110 into a selected number of sub-arrays. In some cases, the sub-arrays may be overlapping. Overlap regions are described in greater detail in connection with FIG. 6. Decomposer circuit 102 is capable of generating a metadata header describing certain properties of each sub-array. The metadata headers may be used to extend the sub-arrays. Metadata headers are described in greater detail below in connection with Table 1. Decomposer circuit 102 combines the sub-array with the metadata header to form a data tile 112.

In one or more example implementations, data tiles 112 are implemented to support building a chain, pipeline, or dataflow graph of N-dimensional signal processing circuit blocks of compute circuitry 106. In some cases, data tiles 112 support the various operations performed by compute circuitry 106 such as neighborhood processing, border effects (e.g., in reference to special processing at borders of the portions of data), and multi-rate processing. Each compute circuit block (e.g., node) in a chain of signal processing blocks of compute circuitry 106 only needs a single data tile 112 at a time to operate and may continue processing data tiles 112 until all sub-arrays of array data 110 are processed. Each of the compute circuit blocks may update the metadata of any data tile 112 operated on by the compute circuit block.

Decomposer circuit 102 provides, or sends, data tiles 112 to compute circuitry 106. Computer circuitry 106, while represented as a single "block" of circuitry, may be formed of one or more, e.g., a plurality of different or independent, circuit blocks. Compute circuitry 106 processes data tiles 112. The metadata header of data tiles 112 supports localized processing of data tiles 112 by compute circuitry 106. As such, data tiles may be processed by compute circuitry 106 in a chain, pipeline, or dataflow graph of compute circuit blocks in IC 100. As data tiles 112 are operated on by compute circuitry 106, the metadata header of the data tiles may be updated to reflect the current state of the properties of the respective data tiles 112.

In an example implementation, compute circuitry 106 implements a processing pipeline or performs various signal processing operations occurring in multiple different stages. Compute circuitry 106, for example, in addition to operating on the data, e.g., sub-array, contained in data tiles 112, may also update the metadata header of one or more or each of data tiles 112 as such data tiles 112 progress through the processing pipeline or stages of signal processing circuitry of compute circuitry 106. Compute circuitry 106 generates and outputs processed versions of data tiles 112 depicted as data tiles 114 in FIG. 1. Data tiles 114 may include a modified version of the sub-array of the original data tile 112, a modified version of the metadata header of the original data tile 112, or both. The metadata header may be modified by changing one or more of the example parameter values specified in Table 1, for example, based on any changes to the sub-array of the data tile.

In another example, compute circuitry 106 may include one or more compute circuit blocks. Each of these compute circuit blocks may operate on a neighborhood of array data 110. An example application is where compute circuitry 106 is configured to perform convolution or filtering. In some cases, special processing is required for elements (e.g., data items) located at the edges or borders of the portions of data operated on by the compute circuit blocks. In other cases, the compute circuit blocks operate as multi-rate circuit blocks that perform up or down-sampling on the received data which changes the dimensions of the portion of array data 110 that is operated on by the compute circuit block. Each data tile 112 may be generated to include the data necessary for each compute circuit block to perform operations such as, for example, neighborhood processing, border effects, and/or multi-rate processing.

Composer circuit 104 receives data tiles 114. Composer circuit 104 is capable of writing the valid data regions of data tiles 114 back to the appropriate or correct locations within external memory 108. For example, composer circuit 104 is capable of writing the valid data regions of data tiles 114 to the correct locations within array data 110. In another example implementation, composer circuit 104 is capable of combining the valid data regions of two or more data tiles 114 into a larger or combined valid data region and writing the combined valid data region back to the correct location in array data 110.

In general, the final N-dimensional array (e.g., the processed version of array data 110) may be created from the sub-arrays of data tiles 114. The content of the final or processed array data 110 processed as described on a data tile-by-data tile basis matches, on an element-by-element basis, the expected result were array data 110 loaded entirely into IC 100 without partitioning or use of data tiles and operated by compute circuitry 106 and then written back to external memory 108 in its entirety.

Figure 2:
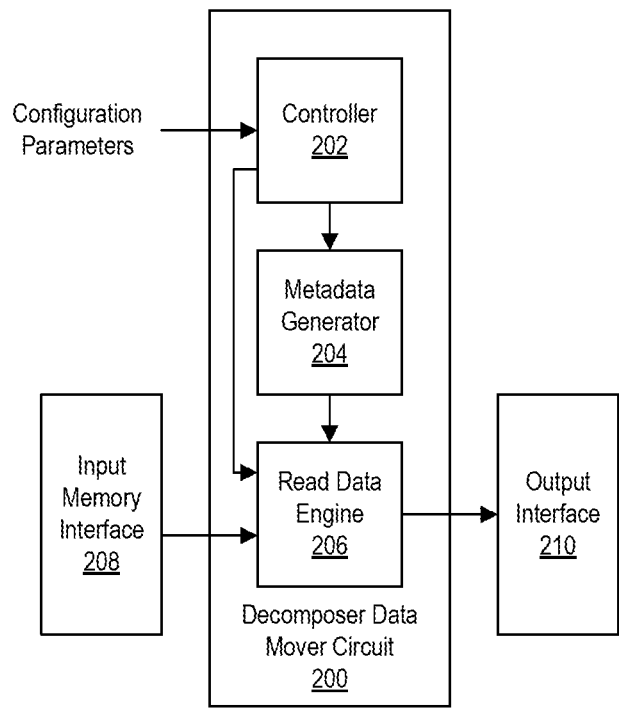
FIG. 2 illustrates an example implementation of a decomposer circuit.

FIG. 2 illustrates an example implementation of a decomposer circuit 200. In the example of FIG. 2, decomposer circuit 200 includes a controller 202, a metadata generator 204, and a read data engine 206. Decomposer circuit 200 is coupled to an input memory interface 208 and an output interface 210. In an example implementation, input memory interface 208 may be implemented as a memory controller. Output interface 210 is coupled to compute circuitry 106. Output interface 210 may be implemented as an interconnect (e.g., one or more switches, multiplexers, buses, cross-bars, or the like).

Controller 202 is capable of coordinating operation of metadata generator 204 and read data engine 206 by way of the control signals shown. In one aspect, controller 202 is capable of controlling operation of metadata generator 204 and read data engine 206 on a per-data tile basis. In another aspect, controller 202 is capable of controlling operation of metadata generator 204 and read data engine 206 on a coarser level, e.g., on a per data tile group basis where each data tile group includes two-or more data tiles. In an example implementation, controller 202 may be implemented as a state machine. In another example, controller 202 may be implemented as a processor that is capable of executing program code. When implemented as a processor, controller 202 may be implemented as a hardwired circuit block or as a soft-processor. A soft-processor refers to a processor that is implemented using programmable logic.

Controller 202 may configured with one or more configuration parameters. Some configuration parameters may be specified at compile time of the circuitry. Other configuration parameters may be specified at runtime of decomposer circuit 200, e.g., after decomposer circuit 200 is implemented and operational within IC 100. For example, in the latter case, controller 202 may receive configuration parameters during operation of decomposer circuit 200 in IC 100 at runtime so that new and/or different configuration parameters may be provided to controller 202 during operation over time to change the operation of decomposer circuit 200.

The configuration parameters specify information used by controller 202 to control and/or coordinate operation of metadata generator 204 and/or read data engine 206. Unless otherwise noted, the example configuration parameters specified herein may be compile time configuration parameters or runtime configuration parameters. Examples of configuration parameters that may be specified at compile time or runtime include location information specifying or indicating a location or starting location of array data 110 in external memory 108, information specifying one or more of a maximum size of a data tile, a size of an overlap region, and/or ideal burst size. In one aspect, the size of the metadata header to be included in a data tile may be fixed such that the maximum size of a sub-array of a data tile is also specified by the maximum size of a data tile. In another aspect, the configuration parameters may directly specify the maximum size of a sub-array of a data tile.

The configuration parameters may also specify an operating mode of metadata generator 204 and/or read data engine 206. For purposes of illustration, the operating mode for metadata generator 204 and/or read data engine 206 may be defined, at least in part, by the various configuration parameters described above. In addition, the operating mode for read data engine 206 may specify whether one or more additional operations such as encryption and/or compression are to be performed, a type of encryption and/or compression to be performed, and the like. In general, any of the operations described herein in connection with metadata generator 204 and/or read data engine 206 may be controlled by controller 202.

In the example of FIG. 2, metadata generator 204 is capable of generating metadata headers describing the sub-arrays to be included in data tiles. That is, for each sub-array to be included in a data tile 112, metadata generator 204 generates a metadata header describing one or more properties of the sub-array obtained from array data 110. Metadata generator 204 is capable of generating metadata based on the control signals received from controller 202. Metadata generator 204 is also capable of generating metadata that is sub-array specific. For example, for a given sub-array fetched from array data 110, metadata generator 204 is capable of generating metadata that specifies a location of that sub-array within or relative to array data 110. The location data for the sub-array and other attributes of the sub-array are known since controller 202 controls operation of read data engine 206 in performing fetch or read of the sub-array from external memory 108.

Read data engine 206 is capable of fetching a portion of data from external memory 108 under control of controller 202. In one aspect, read data engine 206 fetches a sub-array to be included in a data tile 112 that is to be generated. As defined within this disclosure, the term "sub-array" means a portion of, or less than all of, a set of array data such as array data 110.

Read data engine 206 also is capable of combining sub-arrays with corresponding metadata headers generated by metadata generator 204 to create or generate data tiles 112. That is, for each sub-array, read data engine 206 is capable of adding the metadata header for the sub-array generated by metadata generator 204 to create a data tile 112. Read data engine 206 is capable of outputting the resulting data tiles 112 to output interface 210.

Figure 3:
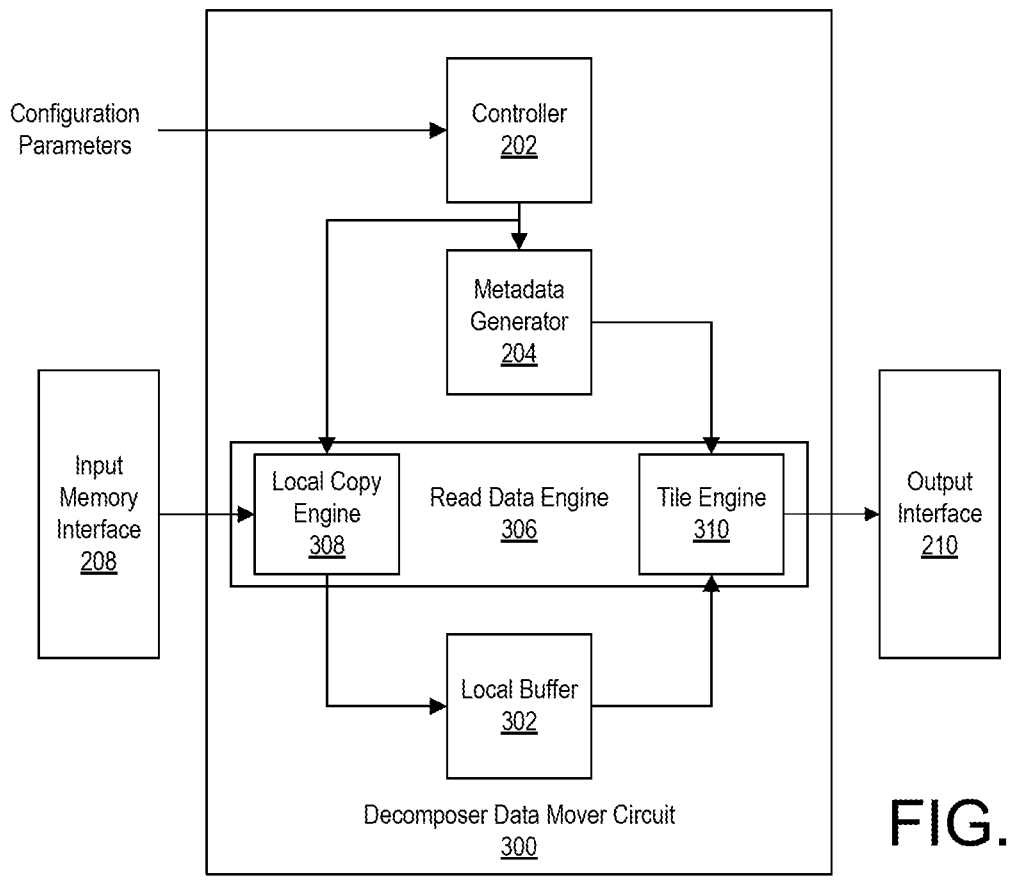
FIG. 3 illustrates another example implementation of a decomposer circuit.

FIG. 3 illustrates another example implementation of a decomposer circuit 300. In the example of FIG. 3, decomposer circuit 300 includes a local buffer 302. Further, a read data engine 306 is included that is adapted to operate using local buffer 302. As shown, read data engine 306 includes a local copy engine 308 and a tile engine 310. In general, decomposer circuit 300 performs operations substantially similar to those operations described in connection with decomposer circuit 200 of FIG. 2. For example, controller 202, metadata generator 204, input memory interface 208, and output interface 210 operate substantially as described in connection with FIG. 2. The inclusion of local buffer 302 and adaptation of read data engine 306 to utilize local buffer 302 provides several additional benefits described in greater detail below. In an aspect, the inclusion of local buffer 302 and adaptation of read data engine 306 may be specified as a compile time configuration parameter for an Electronic Design Automation (EDA) tool configured to compile a circuit design including decomposer circuit 300.

Regarding read data engine 306, local copy engine 308 is capable of fetching a portion of array data 110 from external memory 108. In one or more example implementations, local copy engine 308 is capable of fetching a portion of data from external memory 108. In one aspect, local copy engine 308 fetches a sub-array to be included in a data tile 112 that is to be generated. In another aspect, local copy engine 308 fetches an amount of data that exceeds the size of a sub-array to be included in a data tile 112 to be generated. Local copy engine 308 stores the fetched portion of data in local buffer 302. Local buffer 302 is a memory that is capable of providing temporary storage for data including, but not limited to, an overlap region, one or more sub-arrays, one or more partially built data tiles, and/or one or more data tiles for purposes of processing within decomposer circuit 300.

Tile engine 310 is capable of combining the metadata headers generated by metadata generator 204 with portions of data stored in local buffer 302 to generate data tiles 112. Tile engine 310 is capable of combining sub-arrays taken from the portion(s) of array data stored in local buffer 302 with respective metadata headers resulting in data tiles 112. For any given data tile 112, depending on the configuration parameters of controller 202, tile engine 310 may form the sub-array to include one or more overlap regions. The overlap regions may be read from array data 110 by local copy engine 308 as part of the portion of data obtained from array data 110.

In the example of FIG. 3, the configuration parameters may also specify an operating mode of metadata generator 204 and/or read data engine 306 that is invoked by controller 202. For purposes of illustration, the operating mode for metadata generator 204 and/or read data engine 306 may be defined, at least in part, by the various configuration parameters described above. In addition, the operating mode for read data engine 306 may specify whether a data layout transformation is to be performed, a type of data layout transformation to be performed, whether one or more additional operations such as encryption and/or compression are to be performed, a type of encryption and/or compression to be performed, and the like. In general, any of the operations described herein in connection with metadata generator 204 and/or read data engine 306 may be controlled by controller 202.

In the example of FIG. 3, local buffer 302 implements a level in a memory hierarchy that enables optimization of data access patterns on the external memory side corresponding to input memory interface 208 or the data tile side corresponding to output interface 210 of decomposer circuit 300. Using local buffer 302 allows read data engine 306 to implement one or more additional features such as, for example, data layout transformations. The particular organization of data in array data 110 may be transformed into a different organization within data tiles 112.

For example, local copy engine 308 may perform prefetching or burst accesses from external memory 108 and store the data obtained from array data 110 in local buffer 302. Tile engine 310 may perform a data layout transformation as part of generating data tiles 112. That is, tile engine 310 may apply a data layout transformation to the sub-array of one or more or each data tile 112. In an example implementation, the configuration parameters provided to controller 202 may include alignment information specifying a data alignment for the data tiles 112 to be generated. Controller 202 is capable of controlling operation of read data engine 306 (e.g., local copy engine 308 and/or tile engine 310) to read data from the array data and generate data tiles based on the alignment information. For example, the alignment information may specify that data tiles 112 will be generated with an alignment where the sub-arrays are organized in row major order or in column major order. In another example, the alignment information may specify an alignment for data tiles 112 where the sub-arrays contained therein are vector-aligned.

For purpose of illustration, array data 110 may be an image that is stored in row-major order. Local copy engine 308 may store data obtained from array data 110 (e.g., one or more sub-arrays) in local buffer 302. Tile engine 310 may perform a data layout transformation in generating data tiles 112 where the sub-array in each data tile 112 is specified or arranged in a column-major order. Appreciably, the data layout transformation may be from column-major order (as stored in array data 110) to row-major order (as ordered in data tiles 112).

The particular data layout transformations described are for purposes of illustration and not limitation. Other examples of data layout transformations that may be performed by tile engine 310 can include, but are not limited to, interleaved to planar, rank reduction, scatter-gather processing, and configurable data transformations such as color transforms. The examples provided herein are not intended to be limiting of the inventive arrangements. Other data layout transformations may be implemented by read data engine 306 using local buffer 302.

In other example implementations, tile engine 310 may be configured to perform additional operations. For instance, tile engine 310 may be configured to perform compression so that the sub-arrays of data tiles 112 are compressed. In another example, tile engine 310 may be configured to perform encryption so that the sub-arrays of data tile 112 are encrypted. In still other examples, decomposer circuit 300 may include error detection and correction circuitry that may be enabled or disabled under control of controller 202.

Performing the data layout transformations and/or other operations in decomposer circuit 300 allows data structures to be modified or placed in a form that is more convenient for compute circuitry 106 to handle or process thereby increasing the speed and/or efficiency of compute circuitry 106. For example, circuitry for performing the data layout transformations or other processing need not be included in compute circuitry 106 or duplicated throughout multiple compute circuit blocks of compute circuitry 106. In this regard, decomposer circuit 300 is capable of operating as an external memory traffic re-shaper and/or optimizer.

In one aspect, data alignment for the data tiles 112 may be a special case of a data layout transformation. For purposes of illustration, consider the case were there is 2D data organized in row major order. In an example implementation, data tiles 112 are to be created to support vector operations in compute circuitry 106. Data tiles 112 may need to support operation of compute circuitry 106 using 32 vector lanes. In that case, read data engine 306 is capable of generating data tiles 112 that are a multiple of 32 units (where each unit is N bits corresponding to a vector lane) in width to match the vector operations performed by compute circuitry 106 regardless of the width of array data 110, which may not be a multiple of 32.

Inclusion of local buffer 302 within decomposer circuit 300 may also reduce data traffic between decomposer circuit 300 and external memory 108 due to data reuse. As an illustrative example, once a sub-array is read from array data 110 stored in external memory 108, any overlap region(s) included in the sub-array that may be needed to create other data tiles 112 may be preserved within local buffer 302 and included in such other data tiles 112 when generated by tile engine 310. By storing the overlap region(s) in local buffer 302, at least temporarily for re-use, the overlap regions need not be re-read from external memory 108 for other different data tiles 112 to be generated that are to include the overlap region. This reduces the amount of data exchanged between external memory 108 and decomposer circuit 300.

In another example, inclusion of local buffer 302 provides decomposer circuit 300 with flexible caching capabilities. The cache strategy of local buffer 302 may be driven by the metadata headers generated for the sub-arrays and/or the particular application implemented in IC 100. The cache strategy, which may be implemented by read data engine 306 under control of controller 202, may be specified as a set of rules that define when data may be stored in local buffer 302 and when data may be removed from or overwritten in local buffer 302.

In one aspect, the conditions for adding data to and/or removing data from local buffer 302 may depend on the value or values of field(s) of the metadata header generated for the sub-array. In another aspect, the conditions for adding data to and/or removing data from local buffer 302 may depend on the particular application implemented in IC 100. In another example, the conditions for adding data to and/or removing data from local buffer 302 may depend on a combination of the metadata header generated for the sub-array and the application implemented in IC 100. Thus, the criteria for retaining data in local buffer 302 may be specific to each portion of data or sub-array stored in local buffer 302. In the case of decomposer circuit 300, local copy engine 308, for example, may operate as a dynamic data prefetcher.

In an example implementation, decomposer circuit 300 may be configured to perform dynamic prefetching. The dynamic prefetching may be for data dependent data tile execution order or for application dependent cases such as for the mode estimation and decision portion of a video encoder. For purpose of illustration, consider the case where the processing order of the data tiles is data or application dependent. In such cases, the tile generation pattern is only known at run-time. In such cases, while exploiting application-specific information that may be provided as control data from IC 100 to decomposer circuit 300, decomposer circuit 300 may dynamically prefetch data from the array data to local buffer 302 as close as possible to the data tile execution pattern to increase the cache hit rate.

In other example implementations, decomposer circuit 300 may include multiple input ports and/or multiple output ports. For example, multiple input interfaces 208 may be included where each input interface 208 is coupled to one of a plurality of different input ports of local copy engine 308. In that case, local copy engine 308 may read portions of data from a plurality of different N-dimensional arrays in parallel received over the plurality of input ports. Using the multiple input ports, read data engine 306 may perform data aggregation where data tiles 112 are generated from the multiple N-dimensional arrays.

In another example, multiple output interfaces 210 may be included where each output interface 210 is coupled to one of a plurality of different output ports of tile engine 310. In such a configuration, tile engine 310 may output data tiles 112 using any of a variety of different techniques. For example, data tiles 112 may be output over the multiple output ports using a static pattern, using a broadcast pattern, or using a dynamic pattern. In the broadcast pattern, for example, tile engine 310 is capable of outputting a plurality of different data tiles 112 concurrently in parallel over the different output ports. In another example, tile engine 310 may broadcast a same data tile 112 over multiple different output ports concurrently in parallel. Controller 202 may specify the particular data that is output from each of the respective input ports and/or output ports and may be controlled on a per-data tile basis or a per data tile group basis. Further examples of static, broadcast, and dynamic patterns are described in greater detail herein below with respect to both decomposer and composer circuits.

In other example implementations, tile engine 310 may be configured to perform additional operations such as data duplication over time. For example, tile engine 310 may output data tiles 112 to the same or to different output ports of output interface 210. Data tiles 112, for example, may include or specify kernel weights. In another example, tile engine 310 may perform direct network interfacing. Direct network interfacing refers to an example implementation where output interface 210 is implemented as a network interface that is configured to send data tiles 112 onto a network as opposed to sending data tiles 112 to a local memory in IC 100 that is accessible by compute circuitry 106. In that case, tile engine 310 is configured to communicate and/or control output interface 210 to implement direct network interfacing.

The example decomposer circuits of FIGS. 2 and 3 are capable of generating metadata headers for sub-arrays of array data 110 and generating data tiles 112 that include both the sub-array and the metadata header. Each sub-array, depending on the size of the sub-array and configuration parameters of controller 202, may include zero, one, or more overlap regions of a predetermined size. For example, the size of an overlap region, as specified as a configuration parameter, may be set to zero resulting in no overlap region, or a value other than zero resulting in the inclusion of an overlap region.

The configuration parameters that regulate operation of controller 202 and, by extension, metadata generator 204 and/or read data engine 206, 306 may be compile time configuration parameters (e.g., specified at the time that decomposer circuit is designed) or runtime configuration parameters. In the case of runtime configuration parameters, it should be appreciated that read data engine 206, 306 and metadata generator 204 may be controlled on a per-data tile basis or on a data tile group basis. That is, the portion of data read by read data engine 206, 306 may be dynamically changed for each data tile or for each data tile group. The type of data transformation, if performed, and/or other processing performed by tile engine 310 may be changed on a per-data tile basis or a data tile group basis. Similarly, metadata generator 204 is capable of generating sub-array specific metadata.

In any case, each data tile 112 includes a sub-array that may or may not include one or more overlap regions. Each data tile includes a metadata header that describes the properties of the sub-array contained therein. These data structures are well suited to support data flow based, self-executing systems including those capable of implementing a graph of signal processing circuit blocks.

Figure 4:
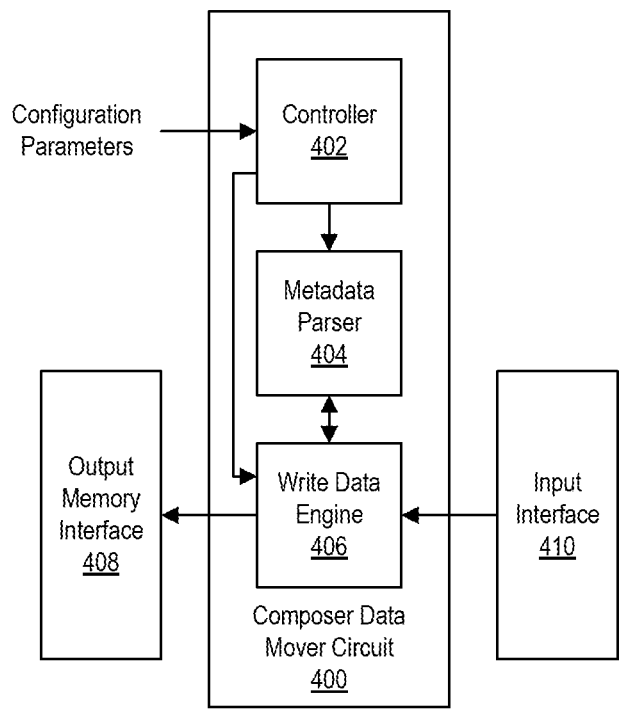
FIG. 4 illustrates an example implementation of a composer circuit.

FIG. 4 illustrates an example implementation of a composer circuit 400. In the example of FIG. 4, composer circuit 400 includes a controller 402, a metadata parser 404, and a write data engine 406. Composer circuit 400 is coupled to an output memory interface 408 and an input interface 410. In an example implementation, output memory interface 408 may be implemented as a memory controller capable of writing to external memory 108. Input interface 410 is coupled to compute circuitry 106. Input interface 410 may be implemented as an interconnect as previously described.

In general, input interface 410 receives data tiles 114, which are processed versions of data tiles 112, from compute circuitry 106. Write data engine 406 is capable of processing data tiles 112 under control of controller 402 and/or metadata parser 404 and write the sub-arrays or valid portions of sub-arrays extracted from data tiles 112 to correct locations in array data 110 within external memory 108. As such, in the example of FIG. 4, data generally flows from input interface 410 to write data engine 406, and to output memory interface 408.

Controller 402 is capable of coordinating operation of metadata parser 404 and write data engine 406 by way of the control signals shown. In an example implementation, controller 402 may be implemented as a state machine. In another example, controller 402 may be implemented as a processor that is capable of executing program code. When implemented as a processor, controller 402 may be implemented as a hardwired circuit block or as a soft-processor.

In one aspect, controller 402 may be configured with one or more configuration parameters. Some configuration parameters may be specified at compile time of the circuitry. Other configuration parameters may be specified at runtime of composer circuit 400, e.g., after composer circuit 400 is implemented and operational within IC 100. For example, in the latter case, controller 202 may receive configuration parameters during operation of composer circuit 400 in IC 100 at runtime so that new and/or different configuration parameters may be provided to controller 402 during operation over time to change the operation of composer circuit 400.

The configuration parameters specify information used by controller 402 to control and/or coordinate operation of metadata parser 404 and/or write data engine 406. In general, composer circuit 400 is configurable to perform operations described in connection with decomposer circuit 200 in the inverse. In some cases, however, operation of write data engine 406 may be dictated by information contained in metadata headers from data tiles 114 instead of configuration parameters and/or control signals. For example, information such as the location or starting location of array data 110 in external memory 108 and/or alignment of array data 110 as stored in external memory 108 may be specified as configuration parameters. The configuration parameters may also specify an operating mode of metadata parser 404 and/or write data engine 406.

In the example of FIG. 4, write data engine 406 receives data tiles 114 from compute circuitry 106 via input interface 410. Metadata parser 404 is capable of reading metadata headers of data tiles 114 received by write data engine 406. Metadata parser 404 is capable of extracting and parsing the metadata headers from data tiles 114. Metadata parser 404 is capable of configuring (e.g., controlling) operation of write data engine 406 based on the parsed metadata headers of the respective data tiles 114.

Having been configured by metadata parser 404 and/or controller 202, write data engine 406 is capable of extracting valid data regions of the sub-arrays from data tiles 114. For example, in cases where the sub-array of a data tile 114 includes one or more overlap regions as indicated by the metadata header, the valid data region may be the sub-array with the overlap region(s) removed. In cases where the sub-array of a data tile 114 does not include any overlap regions, the valid data region may be the entire sub-array of data tile 114. Write data engine 406 is capable of extracting only the valid data region of the sub-array from data tile 114. Write data engine 406 is further capable of writing the valid data region of data tile 114 to the correct location in array data 110 in external memory 108 based on the location information contained in the metadata header of data tile 114 parsed by metadata parser 404. Write data engine 406 writes the valid data region to external memory 108 via output memory interface 408. Write data engine 406 writes the valid data region to a location in array data 110 specified by the metadata header of data tile 114.

Figure 5:
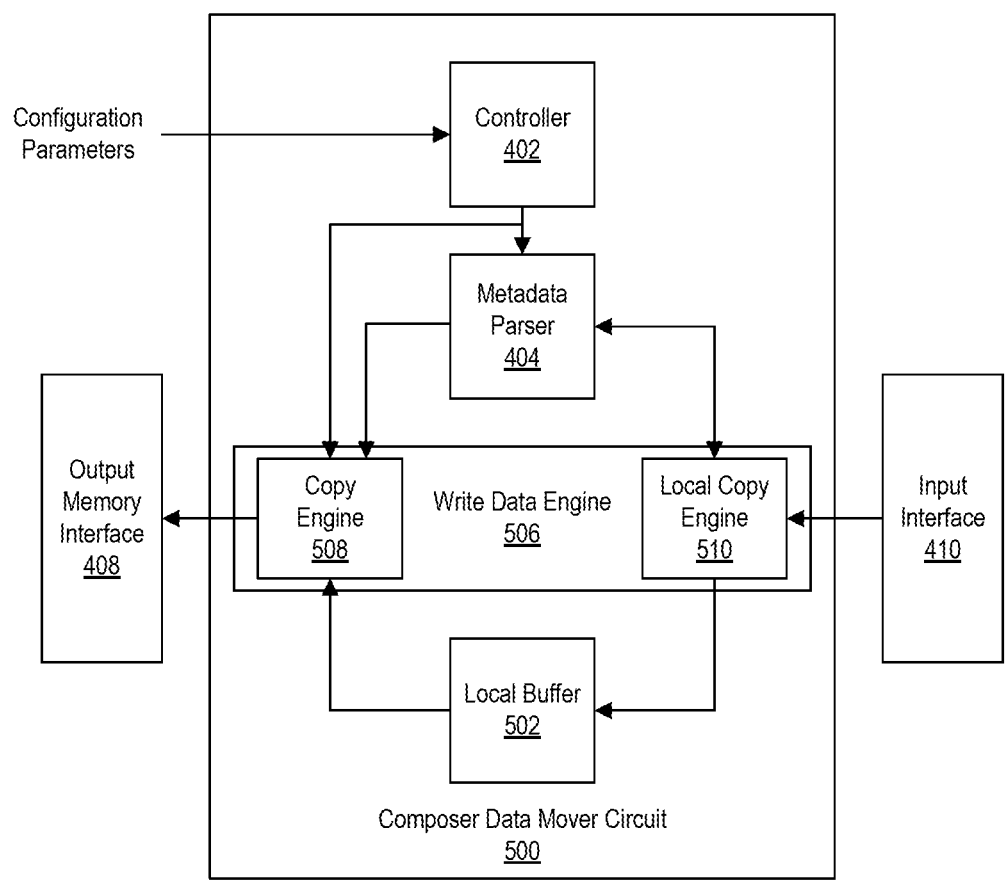
FIG. 5 illustrates another example implementation of a composer circuit.

FIG. 5 illustrates another example implementation of a composer circuit 500. In the example of FIG. 5, composer circuit 500 includes a local buffer 502. Further, a write data engine 506 is included that is adapted to operate using local buffer 502. As shown, write data engine 506 includes a local copy engine 510 and a copy engine 508. In general, composer circuit 500 performs operations substantially similar to those described in connection with composer circuit 400 of FIG. 4. For example, controller 402, metadata parser 404, output memory interface 408, and input interface 410 operate substantially as described in connection with FIG. 4. The inclusion of local buffer 502 and adaptation of write data engine 506 to utilize local buffer 502 provides several additional benefits described in greater detail below. In an aspect, the inclusion of local buffer 502 and adaptation of write data engine 506 may be specified as a compile time configuration parameter for an EDA tool configured to compile a circuit design including composer circuit 500.

Regarding write data engine 506, local copy engine 510 is capable of receiving data tiles 114 from compute circuitry 106 via input interface 410. In the example of FIG. 5, local copy engine 510 stores received data tiles 114 in local buffer 502. Local buffer 502 is a memory that is capable of providing temporary storage of data tiles and other data for purposes of processing within composer circuit 500.

In an example implementation, local copy engine 510, based on control signals provided from metadata parser 404 and/or controller 402, is capable removing any overlap regions of the sub-arrays of data tiles 114 so that only the valid data regions of data tiles 114 are written to local buffer 502. In another example implementation, local copy engine 510 is capable of extracting the valid data regions from data tiles 114 and storing the valid data regions in local buffer 502 based on instructions from metadata parser 404 responsive to parsing the metadata header of the corresponding data tile 114. Copy engine 508, based on the control signals from metadata parser 404 and/or controller 402, is capable of writing the valid data region(s) stored in local buffer 502 to the correct location in array data 110 stored in external memory 108.

Metadata parser 404 is capable of performing operations in addition to parsing data. For example, metadata parser 404 is capable of tracking which data resides in local buffer 504 and instructing copy engine 508 to perform copy operations and/or transfer data from local buffer 504 to the correct positions in the destination external memory 108. To implement such operations, metadata parser 404 is capable of storing some data obtained from one or more metadata headers of data tiles 114 over time.

In the example of FIG. 5, local buffer 502 implements a level in a memory hierarchy that enables optimization of data access patterns on the external memory side or the data tile side of composer circuit 500. Using local buffer 502 allows write data engine 506 to implement data layout transformations. The particular organization of data as received in data tiles 114 (e.g., in sub-arrays) may be transformed into a different organization corresponding to that of array data 110.

In an example implementation, copy engine 508 may perform a data layout transformation prior to or while writing the valid data region to external memory 108. In illustration, copy engine 508 may be configured to perform data layout transformations that are the inverse of data layout transformations performed by decomposer circuit 300 (e.g., removing vector alignment, converting from column-major to row-major order or vice versa, etc.). The particular data layout transformations described are for purposes of illustration. Other data layout transformations may be implemented by write data engine 506 using local buffer 502.

Performing the data layout transformations in composer circuit 500 allows data structures to be modified back to the form in which the data is stored in external memory 108 without requiring such data transformations to be performed by compute circuitry 106. Composer circuit 500 is capable of operating as an external memory traffic re-shaper and/or optimizer.

In another aspect, inclusion of local buffer 502 may also reduce data traffic between composer circuit 500 and external memory 108. As an illustrative example, local buffer 502 may store the valid data regions from a plurality of different data tiles 114. Rather than write each valid data region to external memory 108 as an independent write transaction, copy engine 508 may stitch together two or more valid data regions that are contiguous into a larger valid data region that may be written to external memory 108 in a single write transaction thereby reducing the signaling overhead that occurs between composer circuit 500 and external memory 108.

In another example, inclusion of local buffer 502 provides composer circuit 500 with flexible caching capabilities. The cache strategy of local buffer 502 may be driven by the metadata of data tiles 114 and/or the particular application implemented in IC 100. The cache strategy, which may be implemented by write data engine 506 under control of controller 202, may be specified as a set of rules defining when data may be stored in local buffer 502 and when data may be removed from or overwritten in local buffer 502.

In one aspect, the conditions for adding data to and/or removing data from local buffer 502 may depend on the metadata header of data tiles 114. In another aspect, the conditions for adding data to and/or removing data from local buffer 502 may depend on the particular application implemented in IC 100. In another example, the conditions for adding data to and/or removing data from local buffer 502 may depend on a combination of the metadata headers of data tiles 114 and the application implemented in IC 100. Thus, the criteria for retaining data in local buffer 502 may be specific to each data tile 114 stored in local buffer 502. In the case of composer circuit 500, copy engine 508, for example, is operable to dynamically write stable results, e.g., valid data regions, to array data 110.

For example, the cache strategy of local buffer 502 may be determined by metadata headers of data tiles 114 or other data patterns from the application. The task of local copy engine 510 becomes that of a dynamic prefetcher while the task of copy engine 508 becomes dynamically outputting stable results to array data 110. In the case of composer circuit 500, for example, in response to IC 100 having a data dependent data tile execution order, composer circuit 500 is capable of storing the data tile 114 in local buffer 502 up to the point where the data tile 114 needs to be evicted to external memory 108. During that eviction, the write pattern to external memory 108 is optimized.

In other example implementations, composer circuit 500 may include multiple input ports and/or multiple output ports. For example, multiple input interfaces 410 may be included where each input interface 410 is coupled to one of a plurality of different input ports of local copy engine 510. In that case, local copy engine 510 may receive a plurality of data tiles 114 concurrently in parallel over the multiple input ports. Using the multiple input ports, write data engine 506 may perform data aggregation where the valid data regions of the multiple data tiles 114 received concurrently are combined. Copy engine 508 may write the aggregated data to array data 110.

In another example, multiple output interfaces 408 may be included where each output interface 408 is coupled to one of a plurality of different output ports of copy engine 508. In such a configuration, copy engine 508 may write a plurality of valid data regions out in parallel over the multiple output ports. Further, copy engine 508 may write the plurality of valid data regions to different N-dimensional arrays in parallel. Copy engine 508 may multiplex output of the valid data regions over the plurality of output ports according to a static multiplex pattern or divide the output data dynamically.

An example of a static pattern for composer circuits 200, 300 is where the data tiles have interleaved data such as RGBA pixels. Data from data tiles 114 may be written back to array data 110 in a planar fashion where there are 4 planes in this example corresponding to the R, G, B, and A pixels. The interleaved-to-planar pattern is fixed and, as such, is static. Broadcast (data duplication) may be considered a special variant of a static pattern where the same data is output over the multiple output ports.

An example of a dynamic pattern is one that changes during runtime. For instance, consider the case where IC 100 has a load-balancing system that is capable of dynamically providing compute resources on an "as needed" basis. The execution load on IC 100 may also be data-dependent. To ensure constant throughput, the load-balancing can assign more compute cores or circuits of the compute circuitry to process the received data. The compute core(s) or circuits may be assigned in response to receiving data requiring more computational resources to process and remain assigned while such data is being processed. In that case, the decomposer circuit multiplexes and/or distributes the data over a larger number of output ports to the compute circuitry. In response to receiving data that requires fewer computational resources to process, the load balancing may reduce the number of compute cores or circuits available in the compute circuitry for processing the data while such data is being processed. In that case, the decomposer circuit may multiplex and/or distribute the data over fewer output ports. The number of output ports used varies with the data over time. In such an example, the multiplexing pattern is dynamically adjusted based on the data that is received for processing. Similarly, with respect to the composer circuit, a dynamic data merging can be performed where the number of input ports over which processed data tiles are received from the compute circuitry varies with the type of data being processed over time.

In another example, copy engine 508 may broadcast valid data regions. For example, copy engine 508 may broadcast or send a same valid data region out over each of the plurality of different output ports. Each of the different output ports may be configured to write to a different data array.

The example composer circuits of FIGS. 4 and 5 are capable extracting valid data regions of any data tiles that include overlap region(s) thereby omitting or removing the overlap region(s) from sub-arrays of data tiles. As noted, each sub-array, depending on the size of the sub-array, location of the sub-array within array data 110, and configuration parameters of controller 402 may include zero, one, or more overlap regions of a predetermined size. Composer circuits 400 and 500 are capable of writing the valid data regions extracted from data tiles 114 to external memory 108 subsequent to processing by compute circuitry 106.

The configuration parameters that regulate operation of controller 402 and, by extension, metadata generator 404 and/or write data engine 406, 506 may be compile time configuration parameters (e.g., specified at the time that the composer circuit is designed) or runtime configuration parameters. Examples of runtime configuration parameters may include, but are not limited to, maximum tile size, size of overlap region, tile alignment size, and the like. In the case of runtime configuration parameters, it should be appreciated that write data engine 406, 506 and metadata generator 404 may be controlled on a per-data tile basis or per data tile group basis. That is, a valid data region extracted from data tiles 114 by write data engine 406, 506 may be dynamically changed for each data tile 114 or group of data tiles 114. The type of data transformation, if performed, and/or other processing (e.g., decryption and/or decompression) performed by write data engine 506 may be likewise changed on a per-data tile basis or per data tile group basis. In the case of multiple input ports and/or output ports, the particular data that is output from each of the respective input ports and/or output ports may be controlled on a per-data tile basis and/or per data tile group basis. As noted, the configuration parameters may be provided and change on a per-data tile basis and/or per data tile group basis so that the data layout transformation and/or other operations may be changed over time.

Table 1 lists example properties that may be included as fields of a metadata header of a data tile. As noted, a metadata header of a data tile provides a set of properties that describe the sub-array of the data tile. For purposes of illustration, Table 1 shows example properties for sub-arrays formed from array data that is 2-dimensional. It should be appreciated, however, that the inventive arrangements described within this disclosure also are applicable to sub-arrays created from array data of more than 2-dimensions (e.g., may be used to for sub-arrays created from of N-dimensional array data).

1, those properties designated with the category of "core" are used to enable neighborhood processing and border effects within compute circuitry 106. Those properties designated with the category of "multi-rate" are used in addition to the "core" properties to support multi-rate compute circuit blocks of compute circuitry 106. Those properties designated with the category of "runtime" are used to enable tracking of invalid portions of overlap regions at runtime. It should be appreciated that for implementations of compute circuitry 106 that have a fixed chain, pipeline, or dataflow graph, some of the properties may be omitted since the values become constants for the processing modules of compute circuitry 106.

Figure 6:
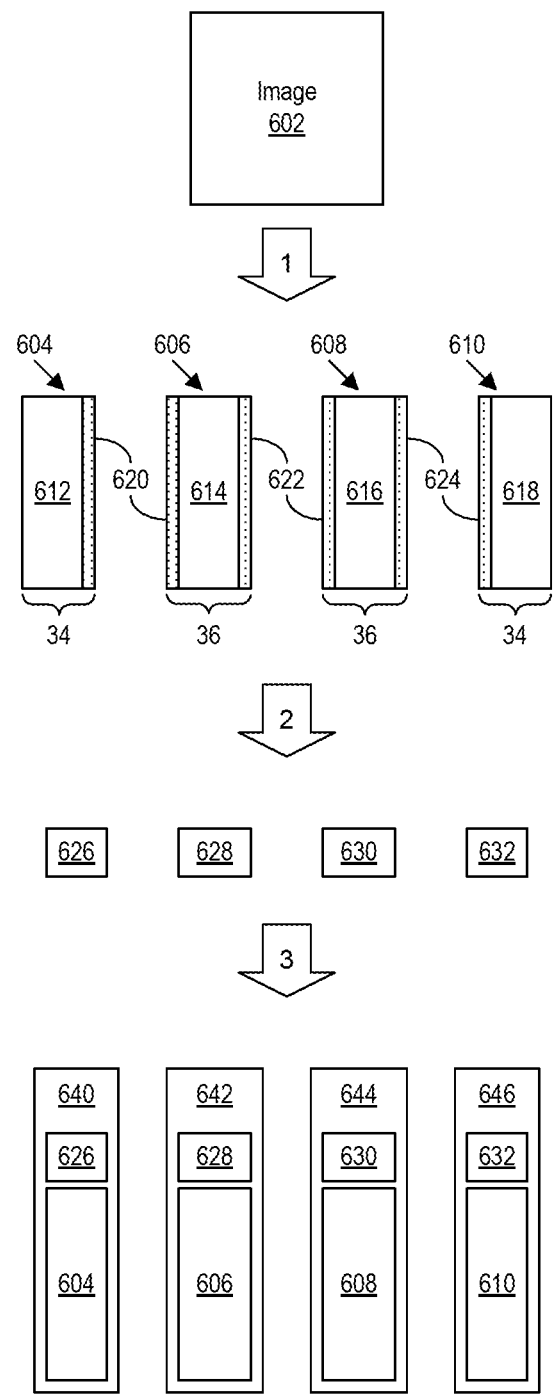
FIG. 6 illustrates an example process of creating data tiles.

FIG. 6 illustrates an example process of creating data tiles. In the example of FIG. 6, an image 602 is shown. For purposes of illustration, image 602 may be sized at 128×128 pixels. Further, image 602 is presumed to be too large to fit within any on-chip memory of IC 100. Image 602 is an example of array data 110 that may be stored in external memory 108. Accordingly, a decomposer circuit as described herein in connection with FIGS. 2 and/or 3 may be used to generate data tiles that do fit within the available on-chip memories and that may be processed by compute circuitry on IC 100.

In stage 1, the decomposer circuit is capable of reading portions of image 602. For example, the decomposer circuit may read a sub-array 604 (e.g., a sub-image) of image 602 from array data stored in external memory 108. For purposes of illustration, sub-array 604 is 34 pixels wide and a full column (e.g., 128 pixels) in height. Sub-array 604 includes a valid data region 612 and an overlap region 620. Overlap

TABLE 1

| Parameter Name | Definition | Category | 2D Example |
| --- | --- | --- | --- |
| groupNumber | Unit number of the array. The groupNumber is a unique identifier for the sub-array and resulting data tile that includes the sub-array. Data tiles may be uniquely identified and distinguished from other data tiles using the groupNumber. | core | Frame number |
| position<N> | Position of the origin of the sub-array within the array data | core | <row,column> in array data in pixels |
| subArraySize<N> | Size of the sub-array including the overlap regions | core | <width,height> of the sub-array |
| overlapSize<N,2> | Overlap region size at each end of the array dimension | core | overlapSizeH <left,right> overlapSizeV <top,bottom> |
| finalArraySize<N> | Final size of the recomposed array | core | <width,height> of final image |
| coordinate<N> | Coordinate of the sub-array in the sub-array configuration | multi-rate | <subImageRow,subImageCol> |
| subArrayConfiguration<N> | Total number of sub-arrays in each dimension | multi-rate | <#subImageRows,#subImageCols> |
| invalidRegion<N,2> | Invalid part of the overlap region for each array dimension | runtime | invalidHorizontalRegion <left,right> invalidVerticalRegion<top,bottom> |

Table 1 illustrates a variety of different properties that support features such as neighborhoods, border effects, and multi-rate circuit modules in compute circuitry 106. In Table region 620 is 2 pixels wide and 128 pixels in height. The decomposer circuit may read sub-array 606 of image 602 from array data stored in external memory 108. Sub-array 606 is 36 pixels wide and 128 pixels in height. Sub-array 606 includes a valid data region 614, overlap region 620, and overlap region 622. Overlap region 622 is 2 pixels wide and 128 pixels in height.

The decomposer circuit may read sub-array 608 of image 602 from array data stored in external memory 108. Sub-array 608 is 36 pixels wide and 128 pixels in height. Sub-array 608 includes valid data region 616, overlap region 622, and overlap region 624. Overlap region 624 is 2 pixels wide and 128 pixels in height. The decomposer circuit may read sub-array 610 of image 602 from array data stored in external memory 108. Sub-array 610 is 34 pixels wide and 128 pixels in height. Sub-array 610 includes valid data region 618 and overlap region 624.

In the example of FIG. 6, each of the overlap regions 620, 622, and 624 is described as being the same size. It should be appreciated that the size of the overlap region from one data tile to another may vary and need not be the same or constant.

In the case of decomposer circuit 200 of FIG. 2, each of the different sub-arrays 604, 606, 608, and 610 may be read from image 602 as shown including the overlap region(s). Thus, overlap region 620, for example, is read one time when reading sub-array 604 and read a second time when reading sub-array 606. Similarly, overlap region 622 is read one time when reading sub-array 606 and read a second time when reading sub-array 608. Overlap region 624 is read one time when reading sub-array 608 and read a second time when reading sub-array 610.

In the case of decomposer circuit 300 of FIG. 3, the local buffer may be used to store overlap regions so that overlap regions need not be re-read in order to be re-used. For example, sub-array 604, which includes data region 612 and overlap region 620, is read and stored in the local buffer. When reading sub-array 606, the decomposer circuit need not re-read overlap region 620 from external memory 108 as that data is already stored in local buffer 302. Instead, the decomposer circuit may read only valid data region 614 and overlap region 622. In this regard, the decomposer circuit reads only a portion of sub-array 606 that is mutually exclusive of sub-array 604. Decomposer circuit 300 may add overlap region 620 to valid data region 614 and overlap region 622 to form sub-array 606 for the resulting data tile.

Use of the overlap regions in the data tiles accommodates for signal processing circuits that handle border effects, neighborhoods, and/or possess multi-rate signal processing capabilities when organized in a chain, pipeline, or dataflow graph configuration. In such cases, the sub-images (e.g., sub-arrays) need to be enlarged with extra data in the array data beyond the edge(s) of the sub-array. The additional data is referred to as the overlap region. The size of the overlap regions may be determined at design/compile time for a static implementation of the chain/pipeline/dataflow graph. In other example implementations, the size of the overlap region(s) may be adapted or changed dynamically during operation (for both decomposition and composition) for a dynamic implementation.

In the example of FIG. 6, since the sub-images that are generated are slices of image 602, the overlap regions are limited to the left and/or right sides of the sub-images. It should be appreciated that in cases where the portions used to create data tiles are not full columns, the overlap regions may be located at the top, at the bottom, on the left, and/or on the right of the sub-array of the data tile. In the example of FIG. 6, to respect the real border of image 602, the left edge of sub-array 604 and the right edge of sub-array 610 have no overlap regions. The real border of any array data being processed, no matter the size of the data tile, may be observed so that overlap regions are not used along any such real borders. It also should be appreciated that an overlap region may be common to two or more sub-arrays and used to create the resulting data tiles for such sub-arrays.

Stage 2 illustrates the creation of metadata headers. In stage 2, the decomposer circuit creates metadata headers 626, 628, 630, and 632 for sub-arrays 604, 606, 608, and 610, respectively.

Stage 3 illustrates creation of the data tiles. In stage 3, the decomposer circuit adds the metadata headers 626, 628, 630, and 632 to sub-arrays 604, 606, 608, and 610, respectively. The resulting combination of metadata headers and sub-arrays inclusive of any overlap regions as described results in data tiles 640, 642, 644, and 646.

It should be appreciated that while the creation of data tiles in FIG. 6 was described in parallel, data tiles 640, 642, 644, and 646 may be created serially. Those overlap regions that are to be re-used for subsequent data tiles may be stored in the local buffer as described. For example, the decomposer circuit may create data tile 640 first followed by data tile 642 so that overlap region 620 may be preserved in the local buffer and re-used in creating data tile 642.

The composer circuit is capable of working in the reverse direction. In general, the composer circuit uses the metadata to extract the valid data region from each data tile thereby removing or omitting the overlap region(s) from the sub-array of the processed data tile. The composer circuit, using the metadata of the data tile, is capable of writing the valid data region back to the correct location in the array data in external memory.

In one or more other example implementations, use of data tiles enables compute circuit blocks in the compute circuitry to perform certain other functions during runtime. For example, compute circuit blocks may be configured to detect the real borders of the array data based on the metadata headers of data tiles 112 and, in response, implement a particular extension mode when processing such data tiles automatically. As an example, when processing data tile 640, a compute circuit block may perform an extension such as a zero extension when processing pixels along the real edge of sub-array 604. In another example, the compute circuit blocks of compute circuitry 106 may apply zero padding to the top real edge of sub-array 604, the left real edge of sub-array 604, and the bottom real edge of sub-array 604 based on the metadata header contained in 640. This reduces the amount of data traversing through IC 100 thereby increasing bandwidth since zero padded data is not sent from the decomposer circuit to compute circuitry 106.

The following discussion refers to the metadata properties of Table 1 in coordination with the example of FIG. 6 or other case where an image is to be decomposed into sub-images. Each of the parameters of the "core" category of Table 1 are needed to support the decomposition of an image having a given height into "M"×"N" sub-images with overlap regions and subsequent composition of such sub-images.

groupNumber is a unique identifier of the image or frame to which a sub-image belongs. If the compute circuitry, decomposer circuit, and composer circuit will not process multiple images simultaneously, this parameter may be omitted where the sub-images are ordered at frame boundaries.

position<row,column> is the pixel-coordinate of the origin of the sub-image in the complete image.

subArraySize<width,height> is the size of a sub-image inclusive of any overlap regions.

overlapSize is the size of the overlap regions of a sub-image.

overlapSizeH<leftright> specifies a size in pixels of a left overlap region and a right overlap region in the horizontal dimension of a sub-image.

overlapSizeV<top,bottom> specifies a size in pixels of a top overlap region and a bottom overlap region in the vertical dimension of a sub-image.

finalArraySize<width,height> is a size in pixels of the final image after processing.

As discussed, in cases where the compute circuitry is fixed at design time, some of the meta-data parameters listed above become compile time constants of the decomposer and composer circuits. As such, the values need not be included or specified as metadata. For example, metadata properties such as subArraySize, overlapSize and finalArraySize may become constants and therefore omitted from the metadata header.

In one or more example implementations, the decomposer circuits of FIGS. 2 and 3 may implement one or more features that simplify the processing of data tiles by the various circuit blocks of the compute circuitry. These features may be compile time and/or runtime configuration parameters. In one example, the decomposer circuit may implement a "snap-to-edge" feature that preserves borders of the image as a real border. In that case, sub-arrays that are created in data tiles are snapped to the edge and overlap regions are only added to the opposing edge of any real border of a sub-array to preserve the edge. This feature is illustrated in the example of FIG. 6 where overlap region 620 is only included to the right of sub-array 604 and overlap region 624 is only included to the left of sub-array 610.

In another example, the decomposer circuit may implement an "alignment on major dimension" feature where sub-arrays contained in the data tiles are aligned to a desired multiple of pixels in the major dimension by extending the overlap regions. In extending the overlap regions, the snap-to-edge property is observed if desired or enabled. The alignment on major dimension feature prepares the data tile for parallel processing and may be used in the case of vectors, for example.

In another example, the decomposer circuit may implement a "stride-free" feature. The stride-free feature enables the decomposer circuit to create data tiles having sub-arrays that are stride free along the major dimension by using snap-to-edge feature. In the case where only one sub-array is requested along the major dimension, the stride may be increased to 2 to achieve this property.

For purposes of illustration, consider an image or video processing example where the images to be processed (e.g., the array data) are stored in external memory using a particular stride in the major dimension. In this example, the major dimension may be horizontal. In the case of high definition images (1920×1080), the images may be stored with a stride of 2048, which includes 128 dummy pixels added per line in this example. Storing the array data in this structure allows the decomposer circuit to implement burst access to the external memory. With the stride-free feature enabled, the decomposer circuit does not generate data tiles having stride data therein. That is, the decomposer circuit removes the dummy pixels from the sub-arrays read from the array data to generate data tiles with sub-arrays that are stride-free. By also using the snap-to-edge feature, an optimized data layout for the data tiles can be achieved.

Multi-rate compute circuit blocks may require certain metadata for correct calculation of the indices/coordinates that will be used in the interpolation. In cases where identical interpolation to full-image processing is required, a projection of the indices/coordinates to be interpolated in the full image domain is needed followed by a selection and potential rounding of the indices/coordinates from which to interpolate in the full-image. A back-projection of these selected indices/coordinates into the sub-array is also needed. To enable the processing described, the metadata properties as described below may be generated by the decomposer circuit and included in the metadata header.

subArrayConfiguration<#subImageRows,#subImageCols> defines the number of sub-arrays in the vertical and horizontal dimension.

coordinate<subImageRow,subImageCol> is the location of the sub-array in the sub-array configuration.

The "runtime" category of metadata property in Table 1, to be distinguished from a runtime configuration parameter, enables profiling of the sub-array properties during development or software simulation and allows for non-static dataflow properties. For instance, the invalidRegion property indicates how much of the overlap region has become invalid because of neighborhood effects at non (full) image borders. Compute circuit blocks are capable of updating the invalidRegion property of a data tile according to the processing characteristics of the respective compute circuit blocks. In one example implementation, compute circuit blocks may be configured to compare the invalidRegion property with the overlapSize property. In response to determining that the invalidRegion property is larger than the overlapSize property, the compute circuit block may be configured to generate an error whether in a software model of the compute circuit block or in an actual physical implementation of the compute circuit block in IC 100 during operation.

In one or more example implementations, the metadata properties described (or a subset thereof) may be used support compute circuit blocks of the compute circuitry that do not support border effects.

The data tiles described herein are also compatible with, and may be used with, available circular buffering techniques. Use of circular buffer techniques may reduce overhead introduced by the overlap regions.

Figure 7:
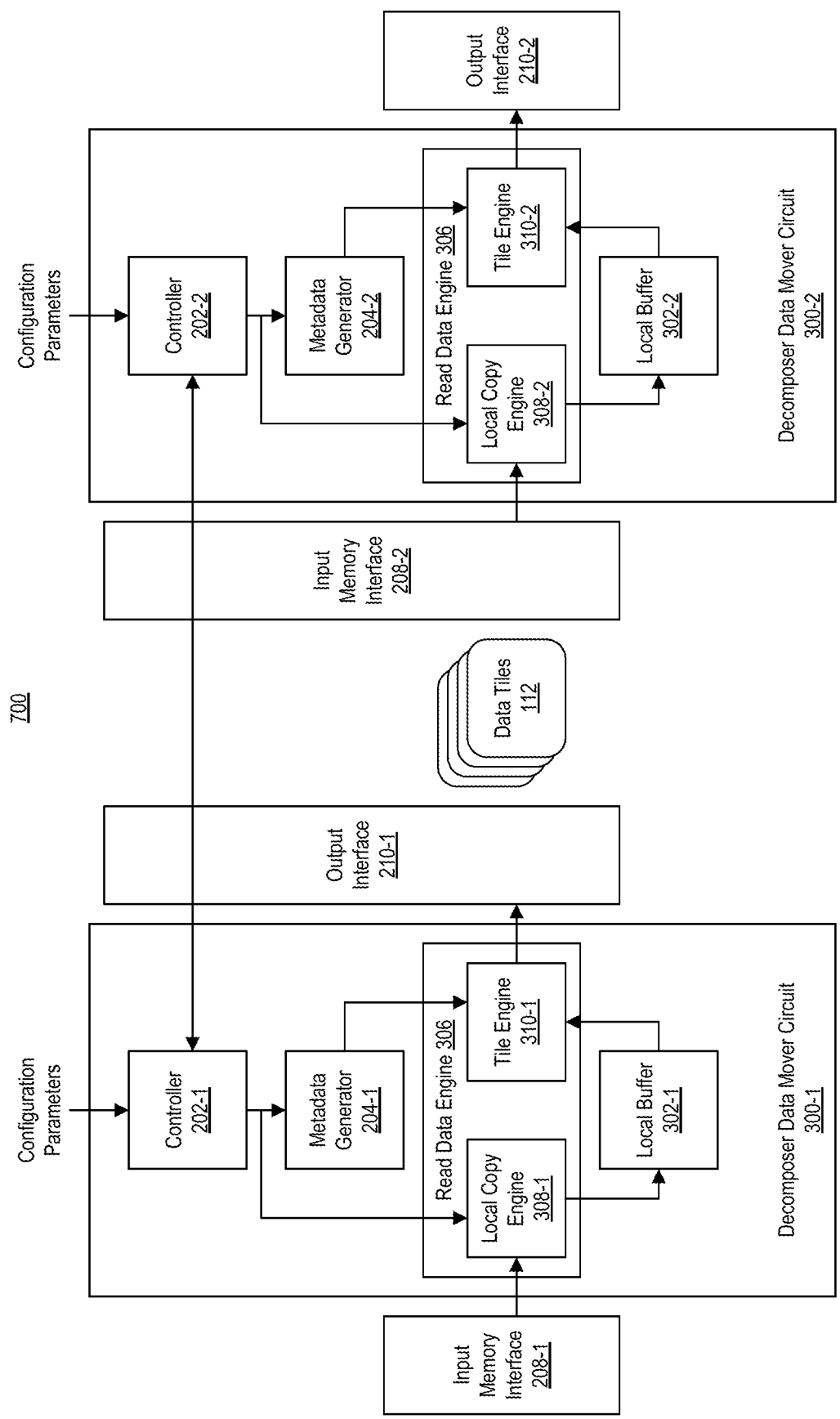
FIG. 7 illustrates an example of a multi-level decomposer circuit.

FIG. 7 illustrates an example of a multi-level decomposer circuit 700. In the example of FIG. 7, multi-level decomposer circuit 700 includes two levels wherein a first decomposer circuit 300-1 is chained to a second decomposer circuit 300-2 to implement a multi-level memory hierarchy. In the example of FIG. 7, each local buffer 302-1 and 302-2 may be implemented or mapped to a particular (e.g., different) memory technology of the IC in which the local buffers are implemented. Decomposer circuits 300-1 and 300-2 may be synchronized. In one example, operation of decomposer circuits 300-1 and 300-2 may be synchronized via backpressure on a data channel that links the decomposer circuits. In another example, decomposer circuits 300-1 and 300-2 may be synchronized through a communication channel illustrated in FIG. 7 linking controller 202-1 with controller 202-2.

Though not shown, a multi-level composer circuit may be formed with two or more of composer circuits 500 of FIG. 5. Operation of composer circuits 500 may be synchronized. In one example, operation of composer circuits 500 organized in a multi-level composer may be synchronized via backpressure on a data channel that links the composer circuits. In another example, operation of the multi-level composer circuit may be synchronized through a communication channel linking the respective controllers of the constituent composer circuits 500.

For purposes of illustration, consider an application implemented in IC 100 that reuses a large amount of data. In such cases, introducing multiple levels in the memory hierarchy may be beneficial to performance. A motion estimation component of a video encoder, for example, determines the motion vector of a current block of size M×N of data from a previous frame. The search area in the previous frame to find the motion vector typically spans multiple M×N blocks. A first level in the memory hierarchy may be a local buffer of a multiple of M×N blocks that will be reused when motion estimating the next M×N block. A second level in the memory hierarchy may store a smaller copy of the content of the first level of the memory hierarchy that is used during motion estimation of the current block where the internal processing advances on a per-pixel basis. In this example, local buffer 302-1 of FIG. 7 may be used to implement the first level of the memory hierarchy while local buffer 302-2 is used to implement the second level of the memory hierarchy.

Figure 8:
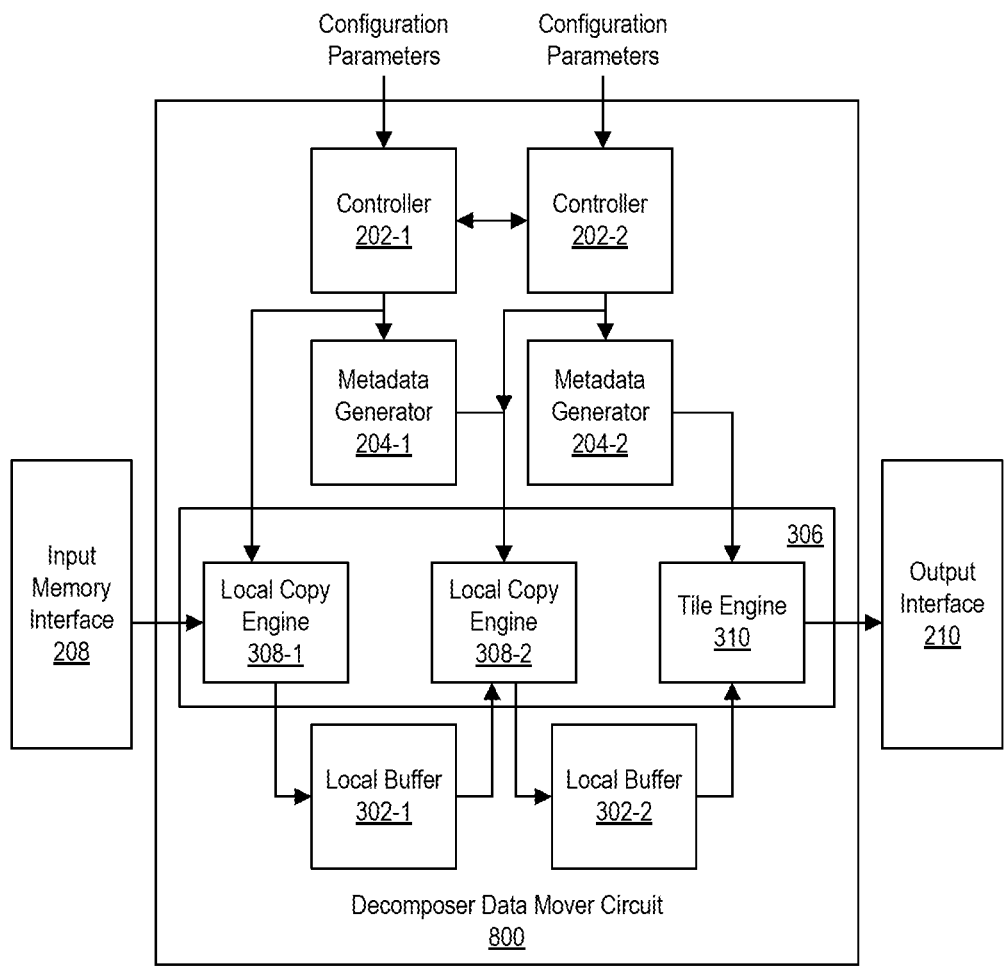
FIG. 8 illustrates another example of a multi-level decomposer circuit.

FIG. 8 illustrates another example of a multi-level decomposer circuit 800. FIG. 8 illustrates an example where the decomposer circuits 300-1 and 300-2 of multi-level decomposer circuit 700 are combined. As pictured, certain circuit blocks such as tile engine 310, input memory interface 208, and output interface 210 are not duplicated (e.g., have a single instance). The direct synchronization between controller 202-1 and 202-2 assures the necessary flow control to correctly manage data access to local buffers 302-1 and 302-1 from input to output.

Though not shown, a multi-level composer circuit may be formed with two or more of composer circuits 500 of FIG. 5 where the composer circuits 500 are combined similar to the illustration of FIG. 8. In the case of a multi-level composer circuit, the circuit blocks of composer circuit 500, with the exception of copy engine 508 are duplicated. One instance of copy engine 508 is used. Further, only one instance of output memory interface 408 and input memory interface 410 are needed. Operation of the multi-level composer circuit may be synchronized through a communication channel linking the respective controllers of the constituent composer circuits 500.

The example of FIG. 8 illustrates a variation of the example of FIG. 7 that provides for a more efficient implementation. In the example of FIG. 8, no intermediate data tiles are generated. Rather, both local buffers 302-1 and 302-2 are controlled internally. The example of FIG. 7 may provide greater flexibility in that decomposer circuits 300-1 and 300-2 may be disbursed or located at different locations through IC 100 whereas the example of FIG. 8 is more monolithic.

Figure 9:
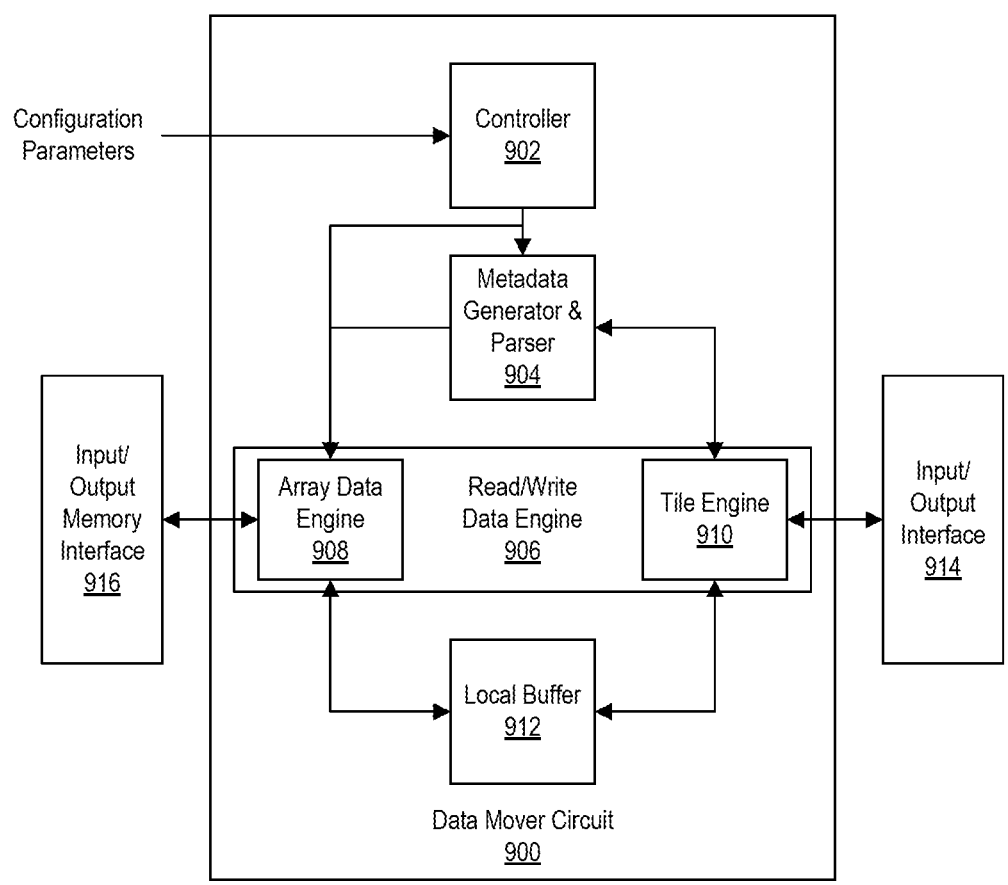
FIG. 9 illustrates an example of a data mover circuit capable of performing decomposer operations and composer operations.

FIG. 9 illustrates an example of a data mover circuit 900 capable of performing decomposer operations and composer operations. The example of FIG. 900 effectively combines the functionality of decomposer circuit 300 with composer circuit 500. Data mover circuit 900 includes a controller 902, a metadata generator and parser 904, a read/write data engine 906 and a local buffer 912. Input/output memory interface 916 is coupled to an array data engine 908 of read/write engine 906. Input/output interface 914 is coupled to a tile engine 910 of read/write data engine 906.

Read/write engine 906 is capable of reading sub-arrays from an external memory storing the sub-arrays within local buffer 912. Array data engine 908 is capable of writing valid data regions extracted from processed data tiles to the external memory based on metadata extracted from data tiles by metadata generator and parser 904. Tile engine 910 is capable of generating data tiles from sub-arrays stored in local buffer 912 and metadata headers generated by metadata generator and parser 904. Tile engine 910 is further capable of writing sub-arrays and/or valid data regions extracted from sub-arrays of received data tiles to local buffer 912. In general, data mover circuit 900 is capable of implementing the functionality of decomposer circuit 300 and composer circuit 500.

Figure 10:
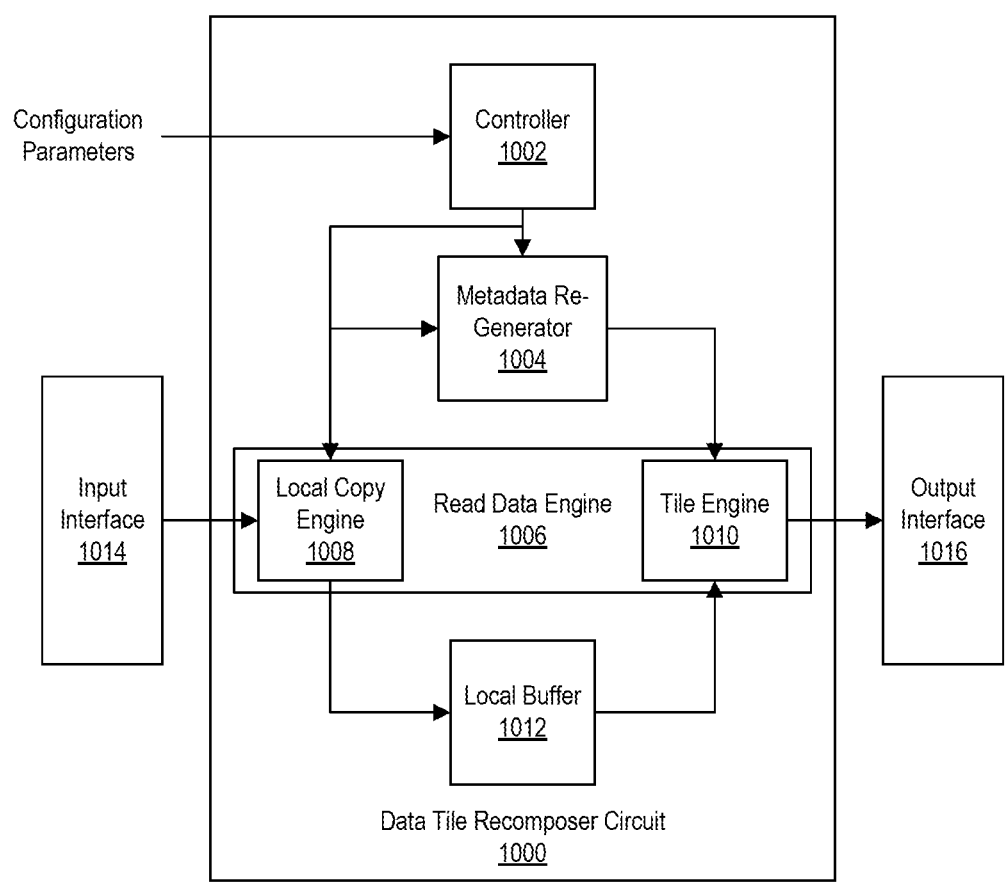
FIG. 10 illustrates an example implementation of a data tile recomposer circuit.

FIG. 10 illustrates an example implementation of a data tile recomposer circuit 1000. In the example of FIG. 10, a decomposer circuit may be reconfigured to process data tiles as opposed to fetching portions of array data from an external memory. In the example of FIG. 10, local copy engine 1008 receives one or more data tiles via input interface 1014 and stores the data tiles in local buffer 1012. In some cases tile engine 1010 modifies the data tiles stored in local buffer 1012. In other cases, tile engine 1010 is capable of combining and/or reforming the data tiles stored in local buffer 1012 into a new set of data tiles that may be output via output interface 1016. The new set of tiles may differ in number from the originally reformed data tiles. Read data engine 1006 (e.g., local copy engine 1008 and tile engine 1010) operate under control of controller 1002 and/or metadata re-generator 1004.

In an example implementation, tile engine 1010 may be configured to combine (e.g., reform) two or more data tiles together into one larger data tile that maybe output. By performing the operation described, data tile recomposer circuit 1000 is capable of resetting the overlap regions when the overlap regions contain or become completely filled with invalid data. The operations described may also be used to break a long chain of processing circuit blocks in the compute circuitry into segments or pieces where the data tiles are "reset" to avoid too much overhead due to the overlap regions. Use of data tile recomposer circuit 1000 allows data tiles to be modified and/or reformed within the IC without having to write the sub-array back to external memory only to reload the data to form another data tile.

In some cases, large chains, pipelines, and/or dataflow graph implementations of the compute circuitry may result in large overlap regions in the data tiles. For example, if a signal processing pipeline of the compute circuitry has many stages with large neighborhood effects, the size of overlap regions of data tiles, as the data tiles move through the pipeline, grow larger resulting in mover overlap among sub-arrays of data tiles. For purposes of illustration, consider a data tile having a sub-array of 128×32 (e.g., FIG. 6) going through 4 stages of a 2-D filter using a 7×7 kernel. Each stage would require an overlap region over 3. Data tiles would need to be generated having an overlap region sized at 12 on the left and 12 on the right. In this example, the data tile has an overhead of 24 (12+12) out of 32 or 75%. The large overlap regions may cause significant processing overhead and hinder performance.

In an example implementation, local composition and decomposition may be used to reduce the size of the overlap regions. The recomposer illustrated in FIG. 10 may be used to combine two or more data tiles at selected locations in the pipeline. For example, by including the recomposer after the second stage of the 2-D filters, the overhead caused by the overlap region would be reduced to 12 out of 32 or 37.5%. This reduces the bandwidth required to pass the data tiles through IC 100.

Figure 11:
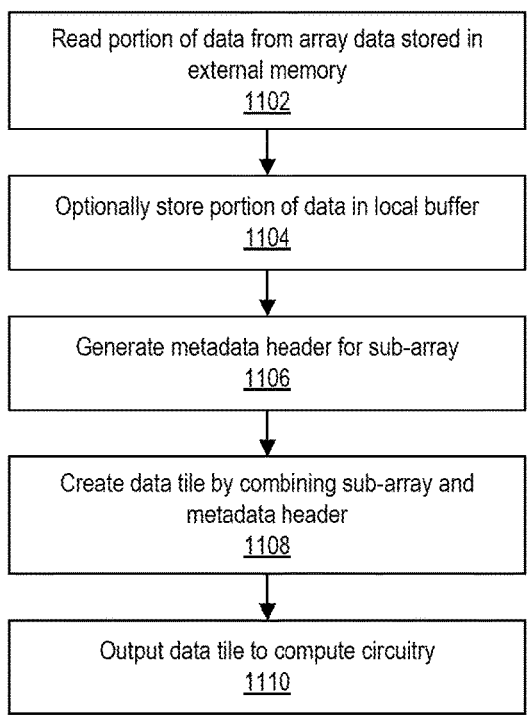
FIG. 11 illustrates an example method of operation for a decomposer circuit.

FIG. 11 is an example method 1100 of operation for a decomposer circuit. Method 1100 may be performed by a decomposer circuit as described within this disclosure with reference to FIG. 2 or 3. Method 1100 describes the generation of a data tile. It should be appreciated that method 1100 may be repeated to create further data tiles. Further, upon each iteration, the decomposer circuit may receive new and/or updated configuration parameters as described within this specification to change the manner of operation of the decomposer circuit to create different data tiles.

In block 1102, the decomposer circuit is capable of reading a portion of data from array data stored in the external memory. In one aspect, the portion of data is a sub-array. The sub-array may include one or more overlap regions depending on the configuration parameters provided to the decomposer circuit. In another aspect, the portion of data may include more than one sub-array. The amount of data read in each iteration of block 1102 may vary based on the configuration parameters received by decomposer circuit each iteration.

In block 1104, the decomposer circuit optionally stores the portion of data in a local buffer. For example, block 1104 may be performed by the example decomposer circuit of FIG. 3, but omitted by the example decomposer circuit of FIG. 2. In block 1106, the decomposer circuit generates a metadata header for a sub-array of the portion of data read from the external memory and stored in the local buffer. The metadata header describes different properties of the sub-array. In this regard, the metadata header is sub-array specific.

In block 1108, the decomposer circuit creates a data tile by combining the sub-array with the metadata header generated in block 1106. In one or more example implementations, the decomposer circuit described in connection with FIG. 3 is capable of performing a data layout transformation or other operation (e.g., decryption or compression) on the sub-array when creating the data tile. The particular operations performed in block 1108, if any, may vary based on the configuration parameters received by decomposer circuit each iteration. In block 1110, the decomposer circuit is capable of outputting the data tile to the compute circuitry.

Figure 12:
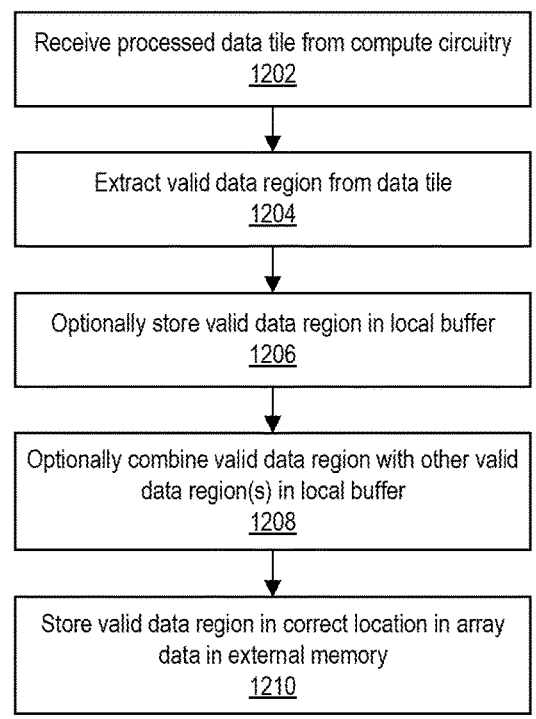
FIG. 12 illustrates an example method of operation for a composer circuit.

FIG. 12 is an example method 1200 of operation for a composer circuit.

Method 1200 may be performed by a composer circuit as described within this disclosure with reference to FIG. 4 or 5. Method 1200 describes the handling of a processed data tile. It should be appreciated that method 1200 may be repeated to continue handling further processed data tiles. Further, upon each iteration, the composer circuit may receive new and/or updated configuration parameters as described within this specification to change the manner of operation of the composer circuit to handle data tiles differently in each iteration.

In block 1202, the composer circuit is capable of receiving a processed data tile from the compute circuitry of the IC. In block 1204, the compose circuitry is capable of extracting the valid data region from the sub-array of the data tile based on the metadata header of the data tile. As noted, the composer circuit is capable of parsing the metadata header of the data tile to determine the valid data region of the sub-array contained therein. In some cases, the valid data region is a portion of the sub-array while in other cases the valid data region is the entirety of the sub-array.

In block 1206, the composer circuit optionally stores the valid data region in the local buffer. For example, block 1204 may be performed by the example composer circuit of FIG. 5, but omitted by the example composer circuit of FIG. 4.

In block 1208, the composer circuit is capable of optionally performing additional processing. In one example, the composer circuit is capable of combining the valid data region extracted from the data tile with one or more other valid data regions extracted from one or more other data tiles to create a larger valid data region. The combined valid data regions may be contiguous data regions in reference to the arrangement of the data regions within the array data stored in the external memory. In another example, the composer circuit is capable of reversing any data layout transformations or other operations (e.g., compression and/or encryption) performed by the decomposer circuit. Block 1208 may be performed by the example composer circuit of FIG. 5, but omitted by the example composer circuit of FIG. 4.

In block 1210, the composer circuit block is capable of storing the valid data region in the correct location in the array data stored in the external memory based, at least in part, on the metadata header.

Figure 13:
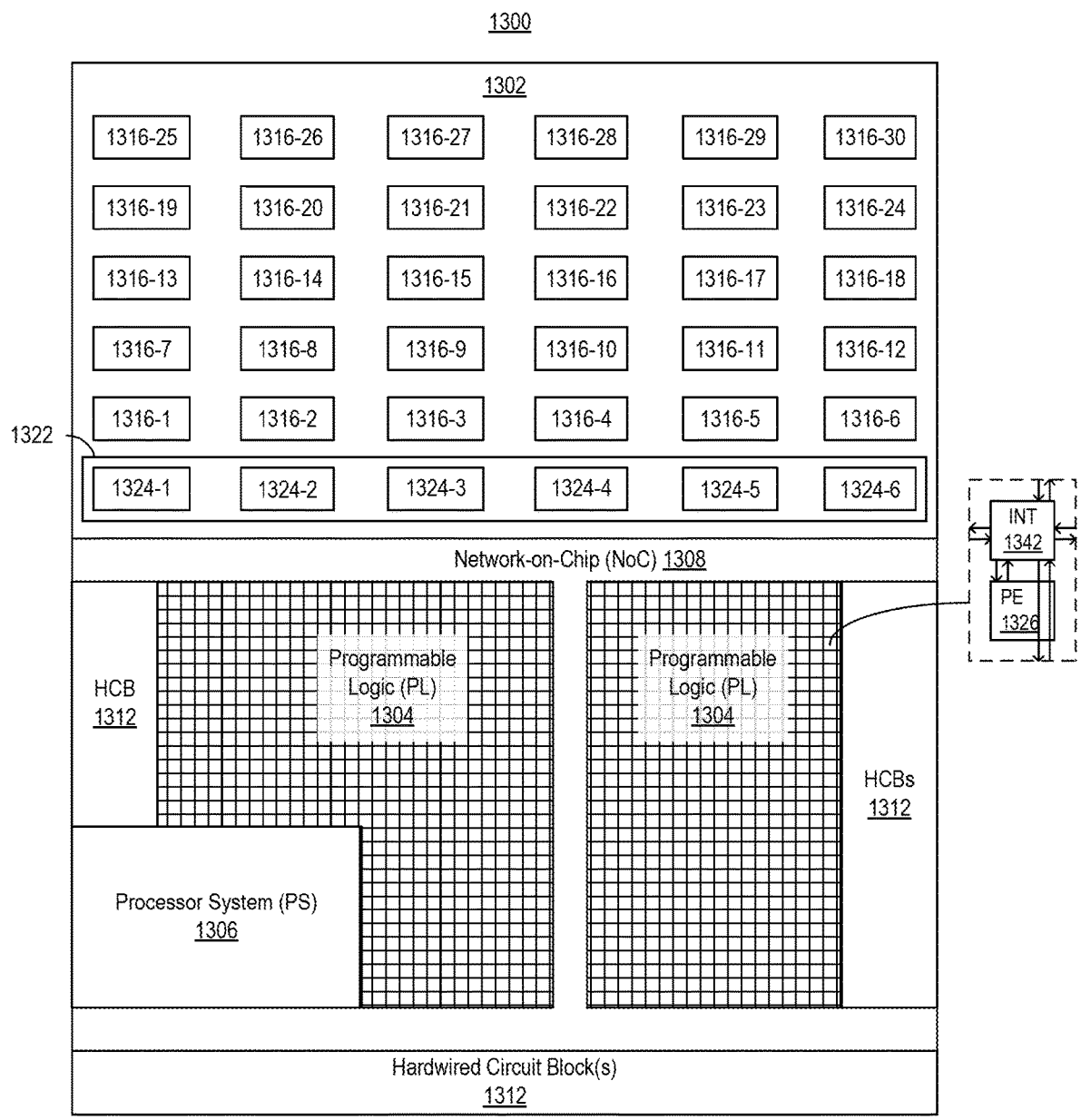
FIG. 13 illustrates an example architecture for an IC.

FIG. 13 is an example architecture for an IC 1300. IC 1300 is also an example of a programmable IC, an adaptive system, and a SoC. In the example of FIG. 13, IC 1300 is implemented on a single die provided within a single package. In other examples, IC 1300 may be implemented using a plurality of interconnected dies within a single package where the various resources of IC 1300 (e.g., circuits) illustrated in FIG. 13 are implemented across the different interconnected dies. IC 1300 illustrates an example architecture that may be used to implement IC 100 of FIG.

In the example, IC 1300 includes a plurality of different subsystems including a data processing engine (DPE) array 1302, programmable logic (PL) 1304, a processor system (PS) 1306, a Network-on-Chip (NoC) 1308, and one or more hardwired circuit blocks 1312. The subsystems described are provided for purposes of illustration. In other ICs in which the example circuits described herein may be implemented, one or more of the subsystems shown in FIG. 13 may be omitted. For example, one or more of DPE array 1302, PL 1304, PS 1306, NoC 1308, and/or hardwired circuit blocks 1312 may be omitted.

DPE array 1302 is implemented as a plurality of interconnected and programmable data processing engines (DPEs) 1316. DPEs 1316 may be arranged in an array and are hardwired. Each DPE 1316 can include one or more cores (not shown) and a memory module (not shown). In one example implementation, cores of the DPEs 1316 may be implemented as custom circuits that do not execute program code.

In another example implementation, cores of DPEs 1316 are capable of executing program code stored in core-specific program memories contained within each respective core. As an example, a core of a DPE 1316 may be implemented as a vector processor capable of performing both fixed and floating-point operations and/or a scalar processor. Each DPE 1316 further includes a data memory (e.g., the memory module) and dedicated multi-bit data movement channels connecting the DPEs 1316. Each DPE 1316 further can include support for direct memory access (DMA) operations and locks to move data to and from other DPEs 1316.

It should be appreciated that the number of DPEs 1316 illustrated in FIG. 13 is for purposes of illustration. DPE array 1302 may include more DPEs 1316 than shown where DPE array 1302 includes more rows of DPEs 1316 and/or more columns of DPEs 1316. For example, in some cases, DPE array 1302 may include hundreds of DPEs 1316. In other examples, DPE array 1302 may include fewer DPEs 1316 than shown in FIG. 13.

DPE array 1302 includes an interface block 1322 that connects DPEs 1316 to other resources of IC 1300. In the example of FIG. 13, interface block 1322 includes a plurality of interconnected tiles 1324 organized in a row. Tiles 1324 are connected so that data may be propagated from one tile 1324 to another bi-directionally. Each tile 1324 is capable of operating as an interface for the column of DPEs 1316 directly above.

In one or more example implementations, DPE array 1302 may be used to implement compute circuitry 106.

PL 1304 is circuitry that may be programmed to perform specified functions. As an example, PL 1304 may be implemented as field programmable gate array type of circuitry. PL 1304 can include an array of programmable circuit blocks. As defined herein, the term "programmable logic" means circuitry used to build reconfigurable digital circuits. Programmable logic is formed of many programmable circuit blocks that provide basic functionality. The topology of PL 1304 is highly configurable unlike hardwired circuitry. Each programmable circuit block of PL 1304 typically includes a programmable element 1326 (e.g., a functional element) and a programmable interconnect 1342. The programmable interconnects 1342 provide the highly configurable topology of PL 1304. The programmable interconnects 1342 may be configured on a per wire basis to provide connectivity among the programmable elements 1326 of programmable circuit blocks of PL 1304 and is configurable on a per-bit basis (e.g., where each wire conveys a single bit of information) unlike connectivity among DPEs 1316, for example.

Examples of programmable circuit blocks of PL 1304 include configurable logic blocks having look-up tables and registers. Unlike hardwired circuitry described below and sometimes referred to as hardwired circuit blocks, these programmable circuit blocks have an undefined function at the time of manufacture. PL 1304 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 1304, are numerous and intermingled with the other programmable circuit blocks of PL 1304. These circuit blocks may also have an architecture that generally includes a programmable interconnect 1342 and a programmable element 1326 and, as such, are part of the highly configurable topology of PL 1304.

Prior to use, PL 1304, e.g., the programmable interconnect and the programmable elements, must be programmed or "configured" by loading data referred to as a configuration bitstream into internal configuration memory cells therein. The configuration memory cells, once loaded with a configuration bitstream, define how PL 1304 is configured, e.g., the topology, and operates (e.g., particular functions performed). Within this disclosure, a "configuration bitstream" is not equivalent to program code executable by a processor or computer.

In one or more example implementations, the example circuit architectures described herein in connection with FIGS. 1, 2, 3, 4, 5, 7, 8, 9, and 10 may be implemented in whole or in part using PL 1304. In one or more example implementations, PL 1304 may be used to implement compute circuitry 106.

PS 1306 is implemented as hardwired circuitry that is fabricated as part of IC 1300. PS 1306 may be implemented as, or include, any of a variety of different processor types each capable of executing program code. For example, PS 1306 may be implemented as an individual processor, e.g., a single core capable of executing program code. In another example, PS 1306 may be implemented as a multi-core processor. In still another example, PS 1306 may include one or more cores, modules, co-processors, I/O interfaces, and/or other resources. PS 1306 may be implemented using any of a variety of different types of architectures. Example architectures that may be used to implement PS 1306 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code. In one or more example implementations, PS 1306 or a core of PS 1306, may be used to implement the controllers described in connection with the example circuit architectures of FIGS. 2, 3, 4, 5, 7, 8, 9, and 10.

NoC 1308 is a programmable interconnecting network for sharing data between endpoint circuits in IC 1300. The endpoint circuits can be disposed in DPE array 1302, PL 1304, PS 1306, and/or selected hardwired circuit blocks 1312. NoC 1308 can include high-speed data paths with dedicated switching. In an example, NoC 1308 includes one or more horizontal paths, one or more vertical paths, or both horizontal and vertical path(s). The arrangement and number of regions shown in FIG. 13 is merely an example. NoC 1308 is an example of the common infrastructure that is available within IC 1300 to connect selected components and/or subsystems.

In some example implementations, nets that are to be routed through NoC 1308 are unknown until a design is created for implementation within IC 1300. NoC 1308 may be programmed by loading configuration data into internal configuration registers that define how elements within NoC 1308 such as switches and interfaces are configured and operate to pass data from switch to switch and among the NoC interfaces to connect the endpoint circuits. In the example of FIG. 13, NoC 1308 is fabricated as part of IC 1300 (e.g., is hardwired) and, while not physically modifiable, may be programmed to establish connectivity between different master circuits and different slave circuits of a user circuit design.

Hardwired circuit blocks 1312 are special-purpose circuit blocks fabricated as part of IC 1300. Though hardwired, hardwired circuit blocks 1312 may be configured by loading configuration data into control registers to implement one or more different modes of operation. Examples of hardwired circuit blocks 1312 may include input/output (I/O) blocks, transceivers for sending and receiving signals to circuits and/or systems external to IC 1300, memory controllers, or the like. Examples of different I/O blocks may include single-ended and pseudo differential I/Os. Examples of transceivers may include high-speed differentially clocked transceivers. Other examples of hardwired circuit blocks 1312 include, but are not limited to, cryptographic engines, digital-to-analog converters (DACs), analog-to-digital converters (ADCs), and the like. In general, hardwired circuit blocks 1312 are application-specific circuit blocks. In one or more example implementations, the example circuit architectures described in connection with FIGS. 2, 3, 4, 5, 7, 8, 9, and 10 may be implemented as hardwired circuit blocks 1312.

The various programmable circuit resources illustrated in FIG. 13 may be programmed initially as part of a boot process for IC 1300. During runtime, the programmable circuit resources may be reconfigured. For example, DPE array 1302 and/or PL 1304 may implement one or more compute circuit blocks of compute circuitry thereby allowing the compute circuitry and chain of compute circuit blocks to be dynamically modified or changed during operation of IC 1300. In that case, the decompose circuit and/or compose circuit may receive updated or new configuration parameters to operate with the newly updated DPE array 1302 and/or PL 1304.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The terms first, second, etc. may be used herein to describe various elements. These elements should not be limited by these terms, as these terms are only used to distinguish one element from another unless stated otherwise or the context clearly indicates otherwise.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, an IC can include a decomposer data mover circuit configured to read a plurality of sub-arrays from array data stored in a source memory; generate a plurality of metadata headers for the plurality of sub-arrays, wherein each metadata header includes location information indicating location of a corresponding sub-array within the array data; create a plurality of data tiles, wherein each data tile includes a sub-array of the plurality of sub-arrays and a corresponding metadata header of the plurality of metadata headers; and output the plurality of data tiles to compute circuitry within the integrated circuit. The IC can include a composer data mover circuit configured to receive processed versions of the plurality of data tiles from the compute circuitry; extract valid data regions from the processed versions of the plurality of data tiles; and write the valid data regions to a destination memory based on the location information from the metadata headers of the processed versions of the plurality of data tiles.

The foregoing and other implementations can each optionally include one or more of the following features, alone or in combination. Some example implementations include all the following features in combination.

In another aspect, each metadata header includes an identifier that uniquely identifies the data tile from other data tiles of the plurality of data tiles.

In another aspect, size of the plurality of sub-arrays is a configurable parameter of the decomposer data mover circuit.

In another aspect, a first sub-array of the plurality of sub-arrays includes an overlap region that is common to at least a second sub-array of the plurality of sub-arrays and a size of the overlap region is a configurable parameter of the decomposer data mover circuit.

In another aspect, the decomposer data mover circuit includes a local buffer configured to store at least the overlap region of the first sub-array. The decomposer data mover circuit may be configured to read a portion of the second sub-array from the source memory, wherein the first sub-array and the portion of the second sub-array are mutually exclusive portions of the array data; generate the second sub-array by combining the overlap region from the local buffer with the portion of the second sub-array; and generate a second data tile including the second sub-array.

In another aspect, the decomposer data mover circuit uses alignment information to generate the data tiles, wherein the alignment information is a configurable parameter of the decomposer data mover circuit.

In another aspect, the composer data mover circuit is operable to remove overlap regions from the sub-arrays of the processed versions of the plurality of data tiles to generate the valid data regions.

In another aspect, the compute circuitry generates the processed versions of the plurality of data tiles. Each processed version of the data tile includes at least one of a modified version of the sub-array or a modified version of the metadata header as performed by the compute circuitry.

A decomposer data mover circuit disposed in an IC can include a read data engine configured to read a plurality of sub-arrays from array data stored in a source memory and a metadata generator configured to generate a plurality of metadata headers for the plurality of sub-arrays. Each metadata header may include location information indicating location of a corresponding sub-array within the array data. The read data engine may be configured to create a plurality of data tiles, wherein each data tile includes a sub-array of the plurality of sub-arrays and a corresponding metadata header of the plurality of metadata headers. The read data engine further may output the plurality of data tiles to compute circuitry within the IC. The decomposer data mover circuit may also include a controller configured to coordinate operation of the read data engine and the metadata generator.

The foregoing and other implementations can each optionally include one or more of the following features, alone or in combination. Some example implementations include all the following features in combination.

In another aspect, each metadata header includes an identifier that uniquely identifies the data tile from other data tiles of plurality of data tiles.

In another aspect, the controller includes a configuration parameter specifying a size of the plurality of sub-arrays.

In another aspect, the decomposer data mover circuit can include a local buffer. The read data engine can include a local copy engine configured to read the plurality of sub-arrays from the source memory and store a first sub-array of the plurality of sub-arrays in the local buffer. The tile engine is configured to generate a first data tile of the plurality of data tiles using the first sub-array from the local buffer and the metadata header corresponding to the first sub-array.

In another aspect, the controller specifies a size of an overlap region of the first sub-array, wherein the overlap region is common with at least a second sub-array of the plurality of sub-arrays. The local copy engine is configured to read a portion of the second sub-array from the source memory, wherein the first sub-array and the portion of the second sub-array are mutually exclusive portions of the array data. The tile engine is configured to generate the second sub-array by combining the overlap region from the local buffer with the portion of the second sub-array and generate a second data tile including the second sub-array.

In another aspect, the metadata generator includes size information for the overlap region in the metadata header.

In another aspect, the controller is operable to receive configuration parameters during runtime, wherein the configuration parameters specify a size of the overlap region.

In another aspect, the read data engine is configured to perform a data layout transformation on the plurality of sub-arrays.

A composer data mover circuit disposed in an IC can include a write data engine configured to receive a plurality of data tiles from compute circuitry in the IC, wherein each data tile includes a sub-array and a metadata header. The compose data mover circuit may include a metadata parser configured to parse the metadata headers of the plurality of data tiles, wherein each metadata header specifies location information indicating location of the sub-array of the data tile in array data stored in a destination memory and a valid data region of the sub-array. The write data engine is configured to extract the valid data regions from the sub-arrays of the plurality of data tiles based on the metadata headers and write the valid data regions to locations in the array data stored in the destination memory based on the location information of the respective metadata headers. The composer data mover circuit may include a controller configured to coordinate operation of the write data engine and the metadata parser.

The foregoing and other implementations can each optionally include one or more of the following features, alone or in combination. Some example implementations include all the following features in combination.

In another aspect, the write data engine extracts the valid data regions from the sub-arrays by removing overlap regions from the sub-arrays.

In another aspect, the controller is operable to receive configuration parameters during runtime to control operation of the metadata parser and the write data engine.

In another aspect, the composer data mover circuit includes a local buffer. The write data engine may include a tile copy engine configured to receive the plurality of data tiles from the compute circuitry and store the valid data regions in the local buffer. The copy engine may be configured to write the valid data regions to the array data.

In another aspect, the copy engine is configured to combine a first valid data region from a first data tile of the plurality of data tiles with at least a second valid data region from at least a second data tile of the plurality of data tiles to generate a combined valid data region and write the combined valid data region to the destination memory.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit, comprising:
   a decomposer data mover circuit configured to:
      read a plurality of sub-arrays from array data stored in a source memory;
      generate a plurality of metadata headers for the plurality of sub-arrays, wherein each metadata header includes location information indicating location of a corresponding sub-array within the array data;
      create a plurality of data tiles, wherein each data tile includes a sub-array of the plurality of sub-arrays and a corresponding metadata header of the plurality of metadata headers;
   wherein a first sub-array of the plurality of sub-arrays includes an overlap region that is common to at least a second sub-array of the plurality of sub-arrays and wherein a size of the overlap region is a configurable parameter of the decomposer data mover circuit; and output the plurality of data tiles to compute circuitry within the integrated circuit; and a composer data mover circuit configured to:

receive processed versions of the plurality of data tiles from the compute circuitry;

extract valid data regions from the processed versions of the plurality of data tiles; and write the valid data regions to a destination memory based on the location information from the metadata headers of the processed versions of the plurality of data tiles.

2. The integrated circuit of claim 1, wherein:

each metadata header includes an identifier that uniquely identifies the data tile from other data tiles of the plurality of data tiles.

3. The integrated circuit of claim 1, wherein size of the plurality of sub-arrays is a configurable parameter of the decomposer data mover circuit.

4. The integrated circuit of claim 1, wherein each metadata header specifies a location and a size of an overlap region included in the corresponding sub-array of the data tile.

5. The integrated circuit of claim 4, wherein:

the decomposer data mover circuit includes a local buffer configured to store at least the overlap region of the first sub-array;

the decomposer data mover circuit is configured to:

read a portion of the second sub-array from the source memory, wherein the first sub-array and the portion of the second sub-array are mutually exclusive portions of the array data;

generate the second sub-array by combining the overlap region from the local buffer with the portion of the second sub-array; and generate a second data tile including the second sub-array.

6. The integrated circuit of claim 1, wherein:

the decomposer data mover circuit uses alignment information to generate the data tiles, wherein the alignment information is a configurable parameter of the decomposer data mover circuit.

7. The integrated circuit of claim 1, wherein:

the compute circuitry generates the processed versions of the plurality of data tiles; and each processed version of the data tile includes at least one of a modified version of the sub-array or a modified version of the metadata header.

8. A decomposer data mover circuit disposed in an integrated circuit, wherein the decomposer data mover circuit comprises:

a read data engine configured to read a plurality of sub-arrays from array data stored in a source memory;

a metadata generator configured to generate a plurality of metadata headers for the plurality of sub-arrays, wherein each metadata header includes location information indicating location of a corresponding sub-array within the array data;

wherein each metadata header specifies a location and a size of an overlap region included in the corresponding sub-array, wherein the overlap region is common to at least one other sub-array of the plurality of sub-arrays;

wherein the read data engine is configured to create a plurality of data tiles, wherein each data tile includes a sub-array of the plurality of sub-arrays and a corresponding metadata header of the plurality of metadata headers, and output the plurality of data tiles to compute circuitry within the integrated circuit; and a controller configured to coordinate operation of the read data engine and the metadata generator.

9. The decomposer data mover circuit of claim 8, wherein:

each metadata header includes an identifier that uniquely identifies the data tile from other data tiles of plurality of data tiles.

10. The decomposer data mover circuit of claim 8, wherein the controller includes a configuration parameter specifying a size of the plurality of sub-arrays.

11. The decomposer data mover circuit of claim 8, further comprising:

a local buffer;

wherein the read data engine includes:

a local copy engine configured to read the plurality of sub-arrays from the source memory and store a first sub-array of the plurality of sub-arrays in the local buffer; and a tile engine configured to generate a first data tile of the plurality of data tiles using the first sub-array from the local buffer and the metadata header corresponding to the first sub-array.

12. The decomposer data mover circuit of claim 11, wherein:

the controller specifies a size of the overlap region of the first sub-array, wherein the overlap region is common with at least a second sub-array of the plurality of sub-arrays;

the local copy engine is configured to read a portion of the second sub-array from the source memory, wherein the first sub-array and the portion of the second sub-array are mutually exclusive portions of the array data; and the tile engine is configured to generate the second sub-array by combining the overlap region from the local buffer with the portion of the second sub-array and generate a second data tile including the second sub-array.

13. The decomposer data mover circuit of claim 8, wherein the metadata generator includes the size information for the overlap region in the metadata header.

14. The decomposer data mover circuit of claim 8, wherein the controller is operable to receive configuration parameters during runtime, wherein the configuration parameters include a size of the overlap region.

15. The decomposer data mover circuit of claim 8, wherein the read data engine is configured to perform a data layout transformation on the plurality of sub-arrays.

16. A composer data mover circuit disposed in an integrated circuit, wherein the composer data mover circuit comprises:

a write data engine configured to receive a plurality of data tiles from compute circuitry in the integrated circuit, wherein each data tile includes a sub-array and a metadata header;

a metadata parser configured to parse the metadata headers of the plurality of data tiles, wherein each metadata header specifies location information indicating location of the sub-array of the data tile in array data stored in a destination memory and a valid data region of the sub-array;

wherein the write data engine is configured to extract the valid data regions from the sub-arrays of the plurality of data tiles based on the metadata headers and write the valid data regions to locations in the array data stored in the destination memory based on the location information of the respective metadata headers; and a controller configured to coordinate operation of the write data engine and the metadata parser;

wherein the write data engine extracts the valid data regions from the sub-arrays by removing overlap regions from the sub-arrays based on a location and a size of the overlap regions of the sub-arrays of the data tiles as specified in the metadata headers of respective ones of the plurality of data tiles.

17. The composer data mover circuit of claim 16, wherein a first data tile of the plurality of data tiles includes an overlap region that is common to at least a second data tile of the plurality of data tiles, and wherein a size of the overlap region is a configurable parameter of a decomposer data mover circuit configured to generate the plurality of data tiles.

18. The composer data mover circuit of claim 16, wherein the controller is operable to receive configuration parameters during runtime to control operation of the metadata parser and the write data engine.

19. The composer data mover circuit of claim 16, further comprising:

a local buffer;

wherein the write data engine includes:

a local copy engine configured to receive the plurality of data tiles from the compute circuitry and store the valid data regions in the local buffer; and a copy engine configured to write the valid data regions to the array data.

20. The composer data mover circuit of claim 19, wherein:

the copy engine is configured to combine a first valid data region from a first data tile of the plurality of data tiles with at least a second valid data region from at least a second data tile of the plurality of data tiles to generate a combined valid data region and write the combined valid data region to the destination memory.

* * * * *